United States Patent [19]

Kable

[11] Patent Number: 4,600,807
[45] Date of Patent: Jul. 15, 1986

[54] ELECTROGRAPHIC APPARATUS

[75] Inventor: Robert G. Kable, Dublin, Ohio

[73] Assignee: Scriptel Corporation, Columbus, Ohio

[21] Appl. No.: 665,302

[22] Filed: Oct. 26, 1984

[51] Int. Cl.⁴ .......................................... G08C 21/00
[52] U.S. Cl. ...................................... 178/19; 340/710
[58] Field of Search ........................... 178/18, 19, 20; 340/709, 710; 364/521

[56] References Cited

U.S. PATENT DOCUMENTS

| | | | |
|---|---|---|---|
| 2,925,467 | 2/1960 | Becker | 178/18 |
| 3,005,050 | 10/1961 | Koenig | 178/20 |
| 3,449,516 | 6/1969 | Cameron et al. | 178/18 |
| 3,466,391 | 9/1969 | Ellis | 178/18 |
| 3,497,617 | 2/1970 | Ellis | 178/19 |
| 3,522,664 | 8/1970 | Lambright et al. | 35/8 |
| 3,530,241 | 9/1970 | Ellis | 178/19 |
| 3,576,356 | 4/1971 | Hyman | 350/156 |
| 3,582,962 | 6/1971 | Mazza | 178/19 |
| 3,588,345 | 6/1971 | Dym | 178/18 |
| 3,590,158 | 6/1971 | Pabst | 178/18 |
| 3,591,718 | 7/1971 | Asano et al. | 178/19 |
| 3,624,293 | 11/1971 | Baxter | 178/18 |
| 3,632,874 | 1/1972 | Malavard et al. | 178/18 |
| 3,648,277 | 3/1972 | Whetstone et al. | 340/347 AD |
| 3,670,103 | 6/1972 | Baxter et al. | 178/19 |
| 3,699,439 | 10/1972 | Turner | 324/71 R |
| 3,757,322 | 9/1973 | Barkan et al. | 340/365 C |
| 3,857,022 | 12/1974 | Rebane et al. | 235/151 |
| 3,885,097 | 5/1975 | Pobgee | 178/18 |
| 3,911,215 | 10/1975 | Hurst et al. | 178/18 |
| 3,921,165 | 11/1975 | Dym | 340/347 NT |
| 3,958,234 | 5/1976 | Hoo | 340/324 M |
| 3,959,585 | 5/1976 | Mattes et al. | 178/18 |
| 3,992,579 | 11/1976 | Dym et al. | 178/18 |
| 4,018,989 | 4/1977 | Snyder et al. | 178/18 |
| 4,055,726 | 10/1977 | Turner et al. | 178/18 |
| 4,071,689 | 1/1978 | Talmage et al. | 178/18 |
| 4,079,194 | 3/1978 | Kley | 178/18 |
| 4,081,603 | 3/1978 | Davis et al. | 178/19 |
| 4,087,625 | 5/1978 | Dym et al. | 118/19 |
| 4,177,354 | 12/1979 | Mathews | 118/18 |
| 4,198,539 | 4/1980 | Pepper | 178/18 |
| 4,214,122 | 7/1980 | Kley | 178/18 |
| 4,302,011 | 11/1981 | Pepper | 273/85 G |
| 4,346,260 | 8/1982 | Kaufmann | 178/18 |
| 4,435,616 | 3/1984 | Kley | 178/18 |
| 4,456,787 | 6/1984 | Schlosser et al. | 178/19 |
| 4,523,654 | 6/1985 | Quagle et al. | 178/19 |

OTHER PUBLICATIONS

Linear Current Division in Resistive Areas, J. A. Turner, G. J. Ritchie, Spring Joint Computer Conference, 1970, pp. 613–620.

Fast Computer Graphic Data Entry, J. A. Turner, G. J. Ritchie, IEE Conference Publication No. 150, pp. 24–27.

Primary Examiner—Stafford D. Schreyer
Attorney, Agent, or Firm—Mueller and Smith

[57] ABSTRACT

An electrographic apparatus utilizing a resistive layer which operates in conjunction with a stylus or tracer. Either the resistive layer or the cursor may be excited from an a.c. source to develop coordinate-defining electrical signals. A sequence of border switching arrays is provided which minimizes the number of switching components required for any given resistive layer or tablet architecture. Improved accuracy is achieved through an automatic gain control and gain election procedure as well as through the imposition of a positive offset signal and a control technique wherein the offset values of the circuit are cyclically evaluated and the coordinate data information is adjusted in accordance with that evaluation.

51 Claims, 33 Drawing Figures

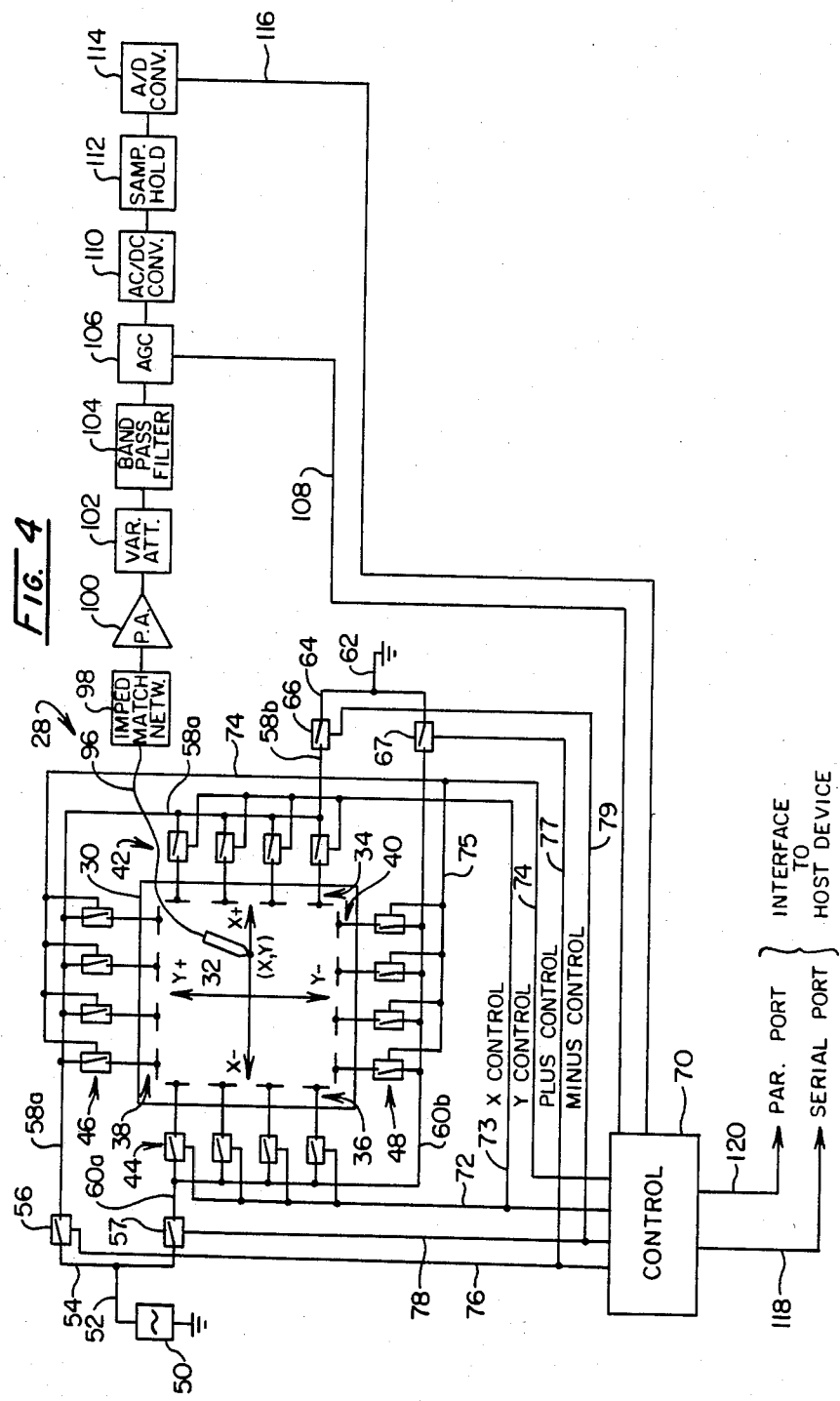

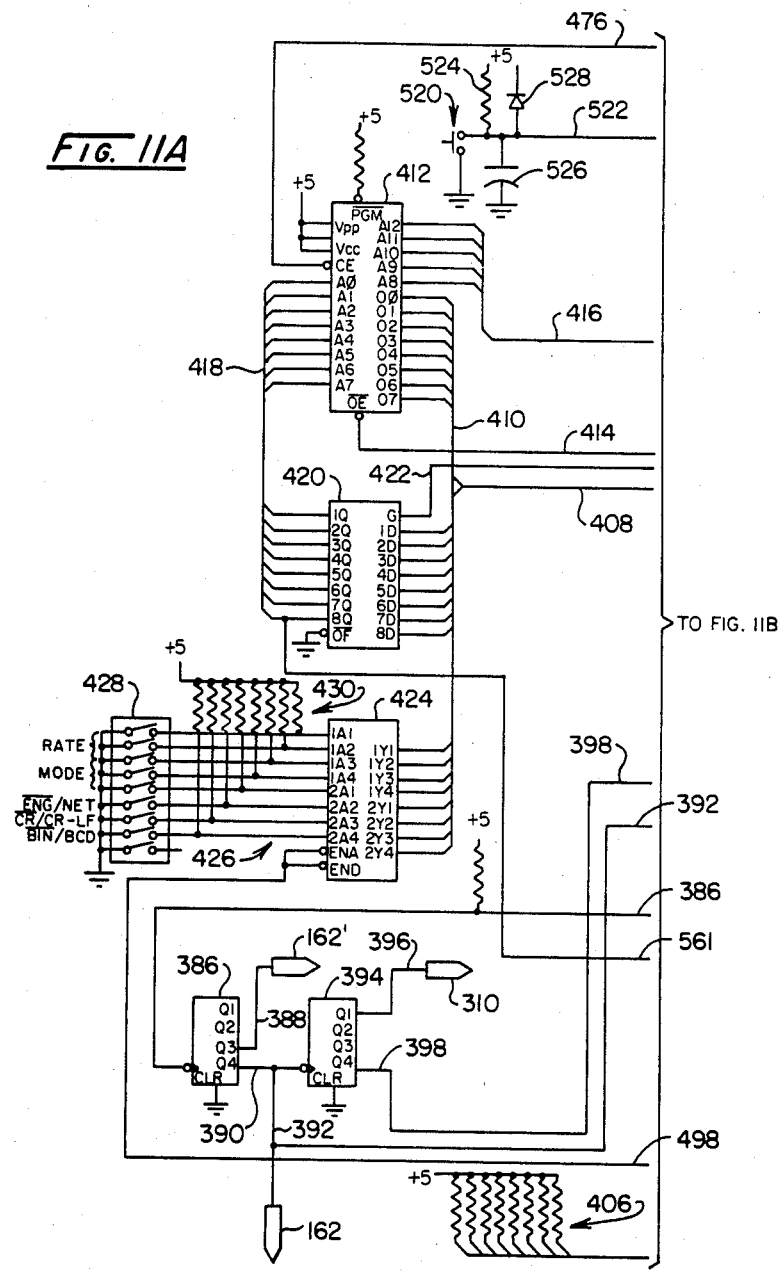

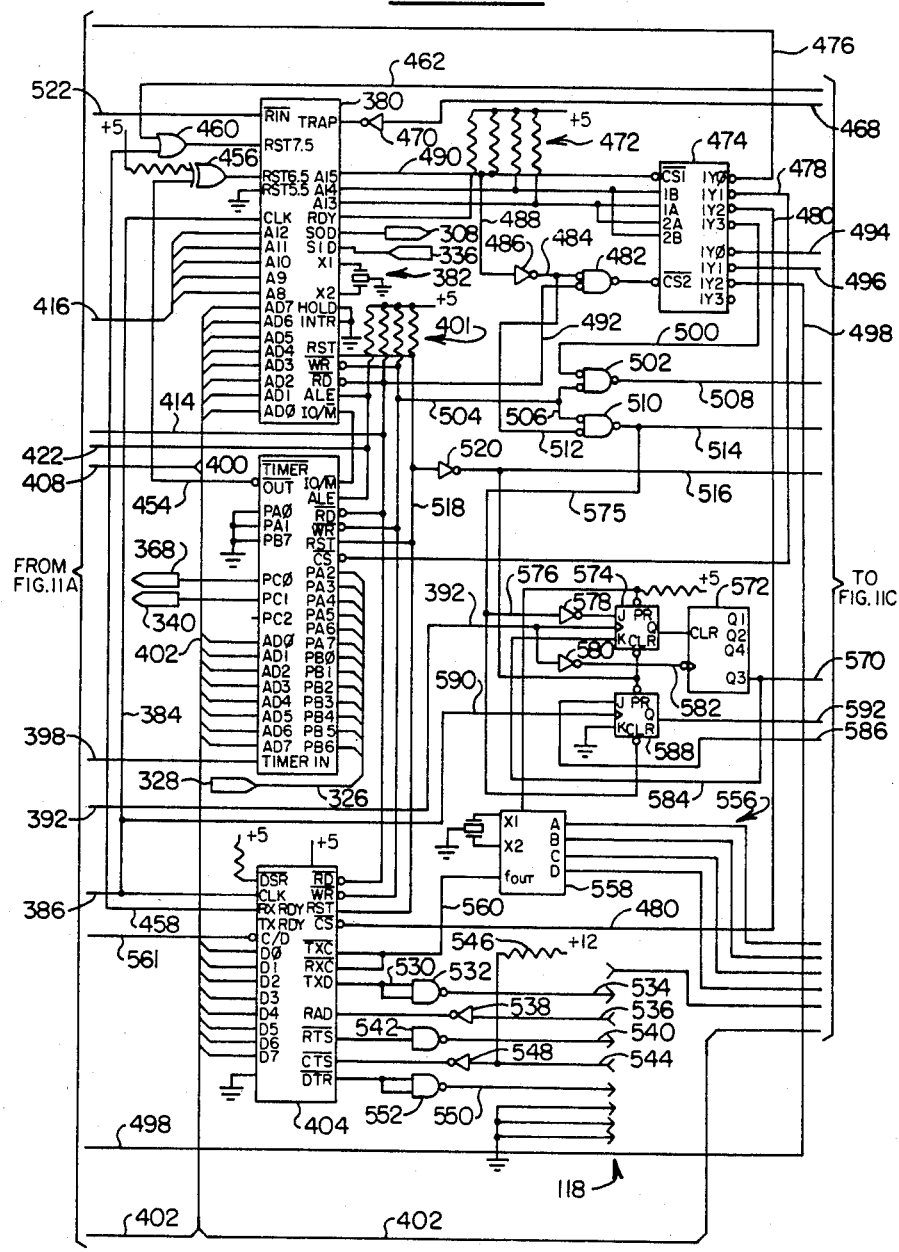

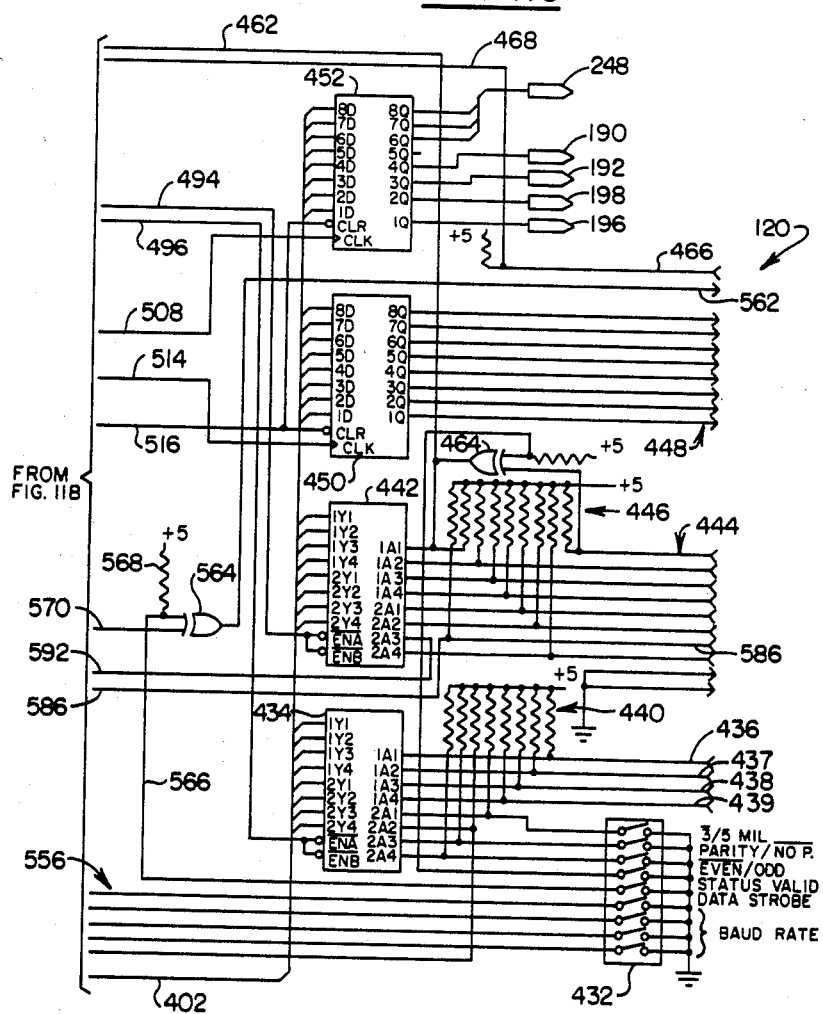

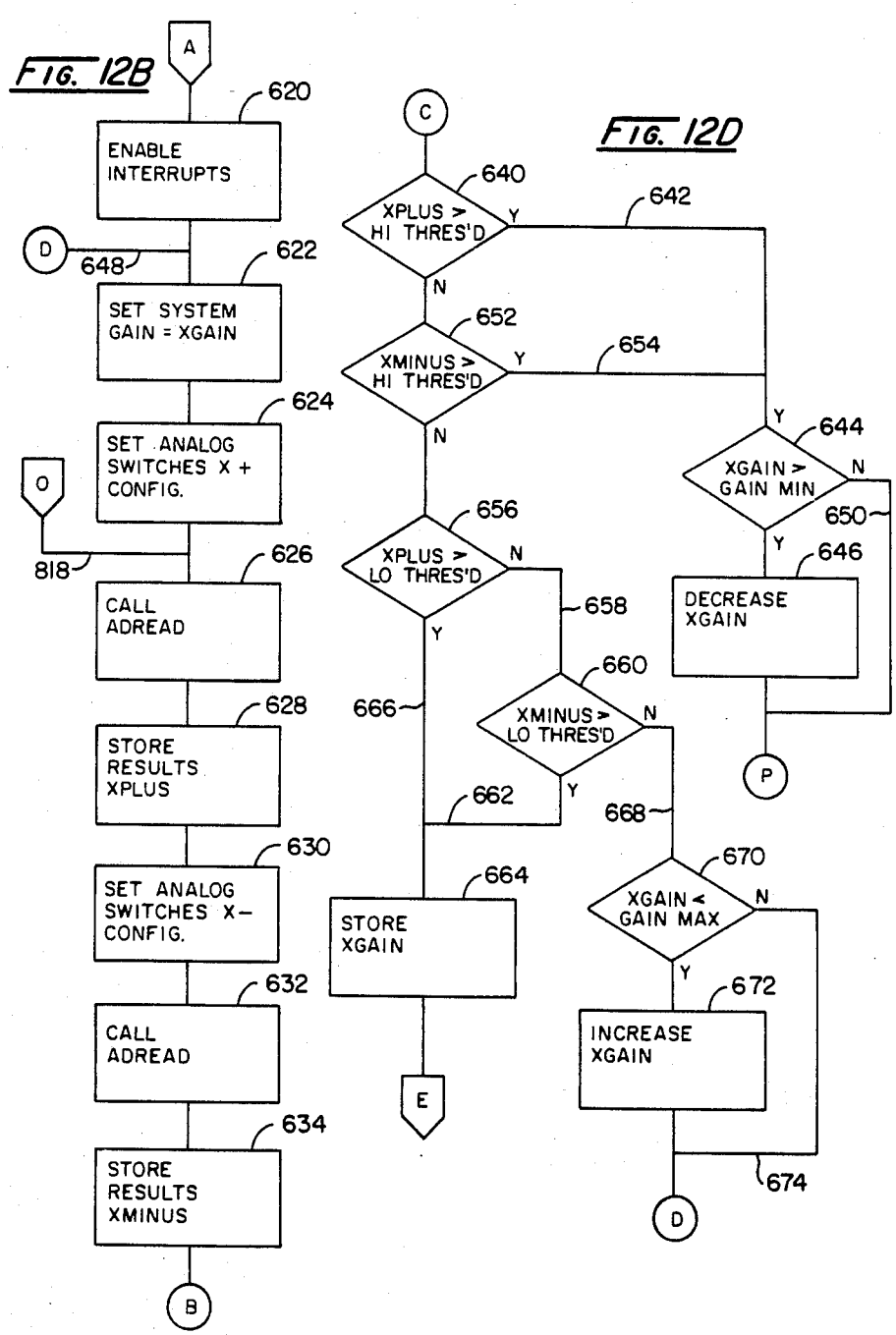

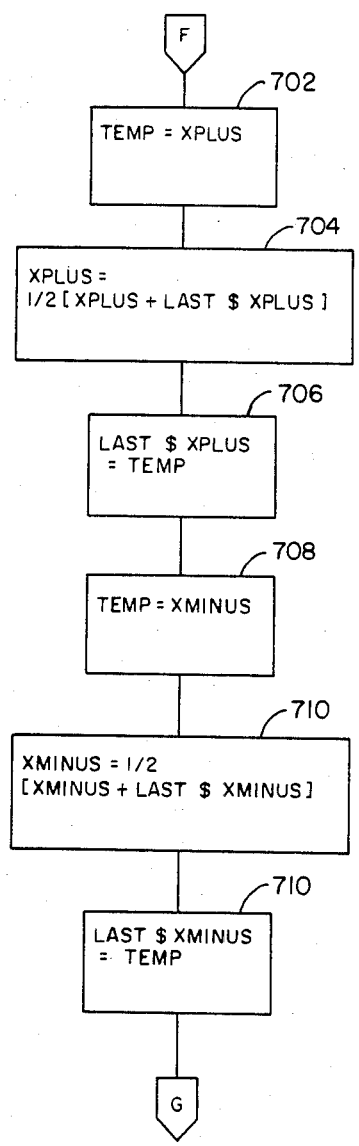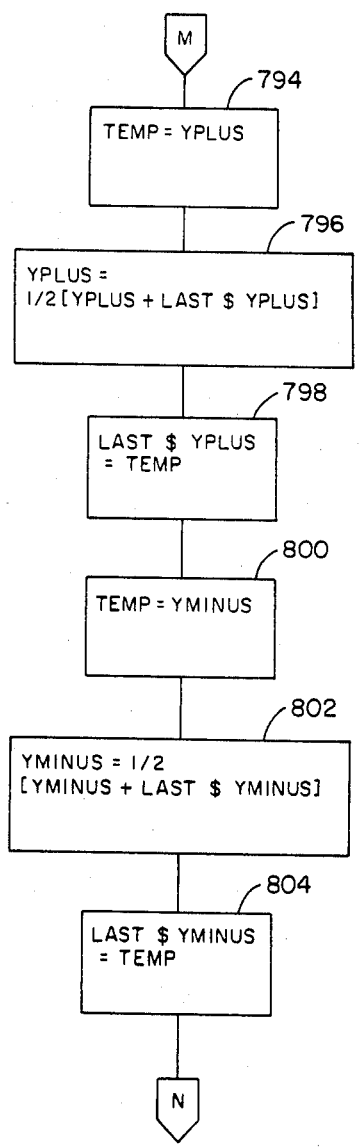

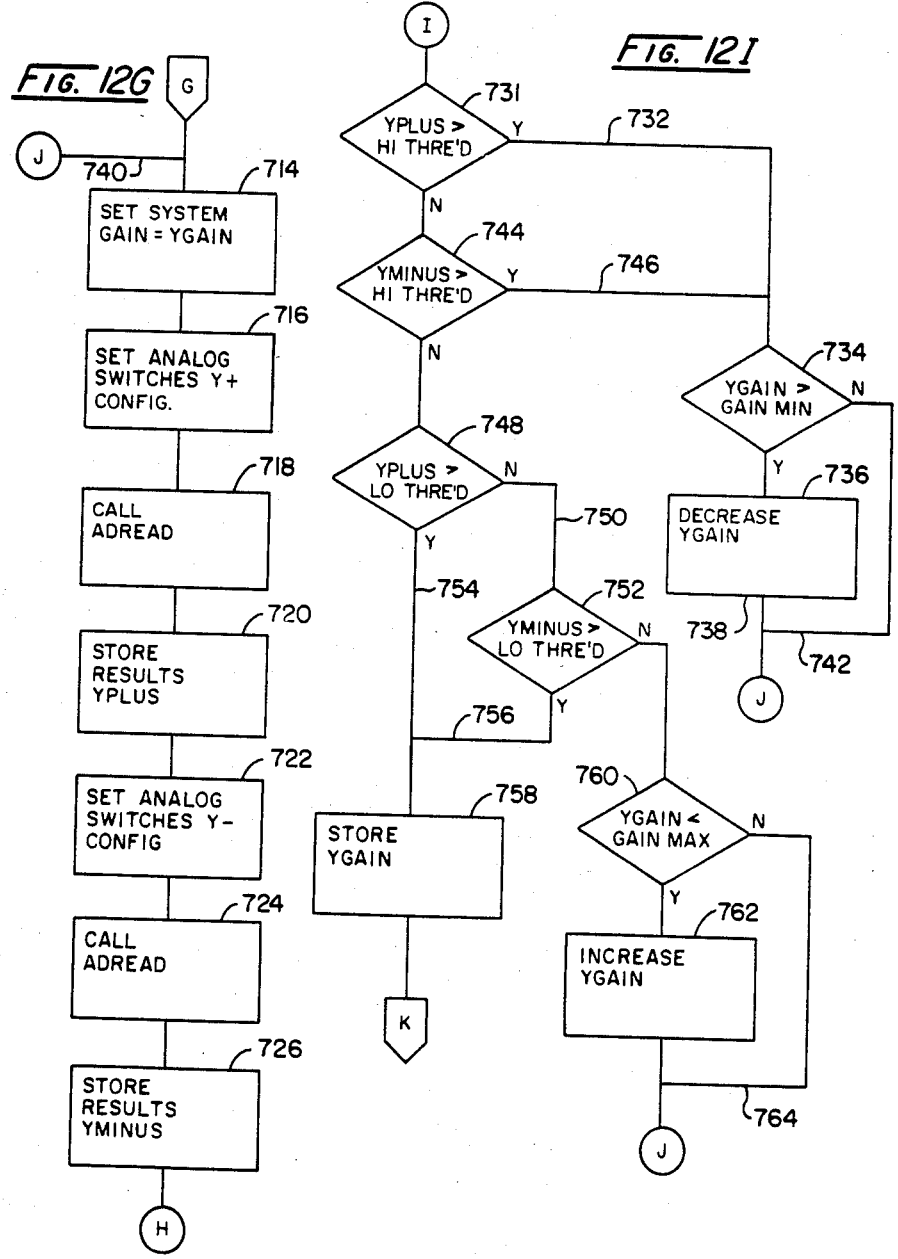

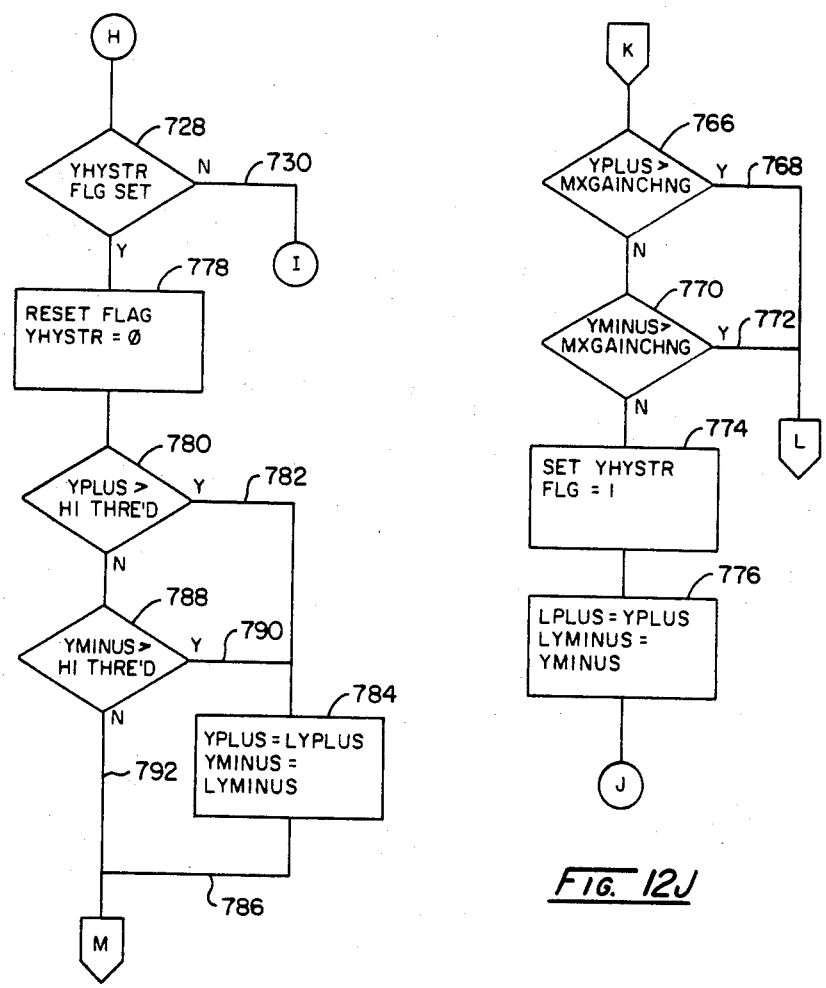

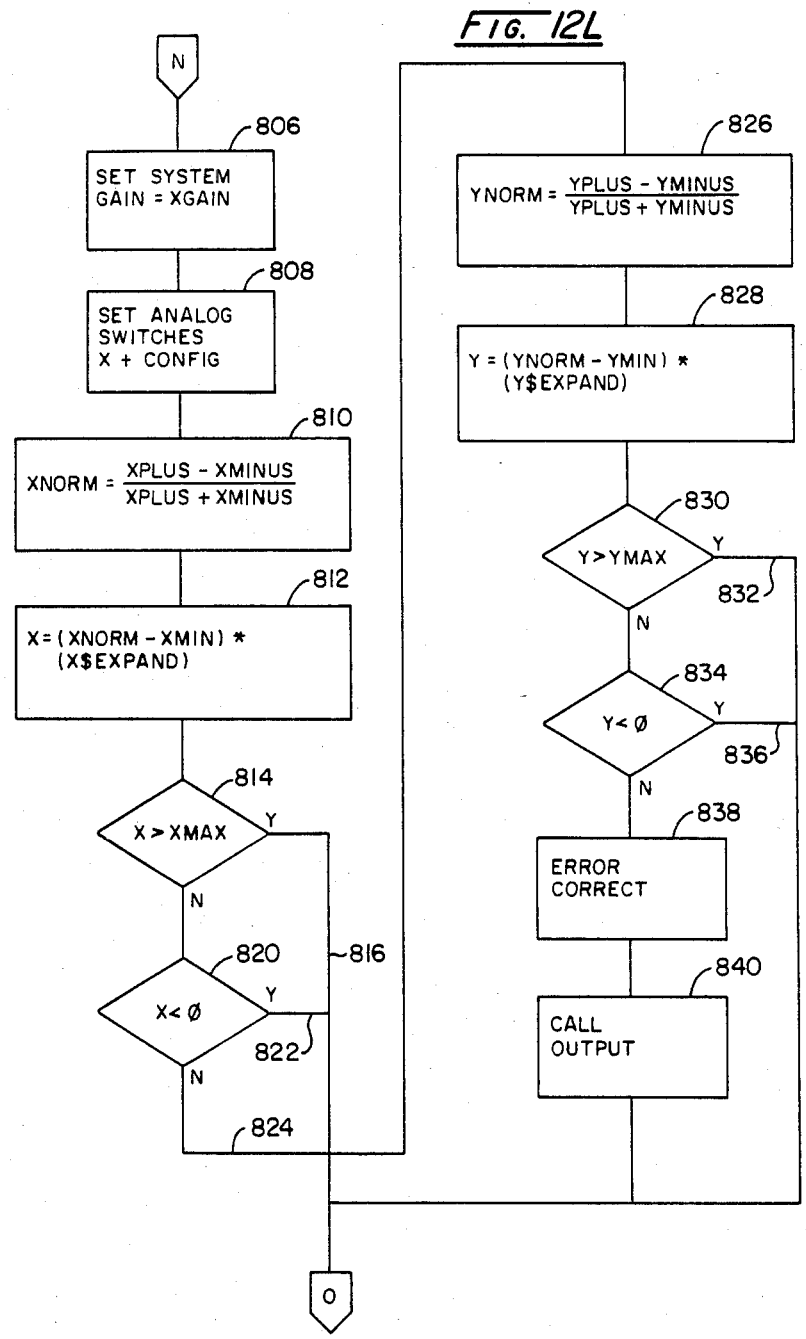

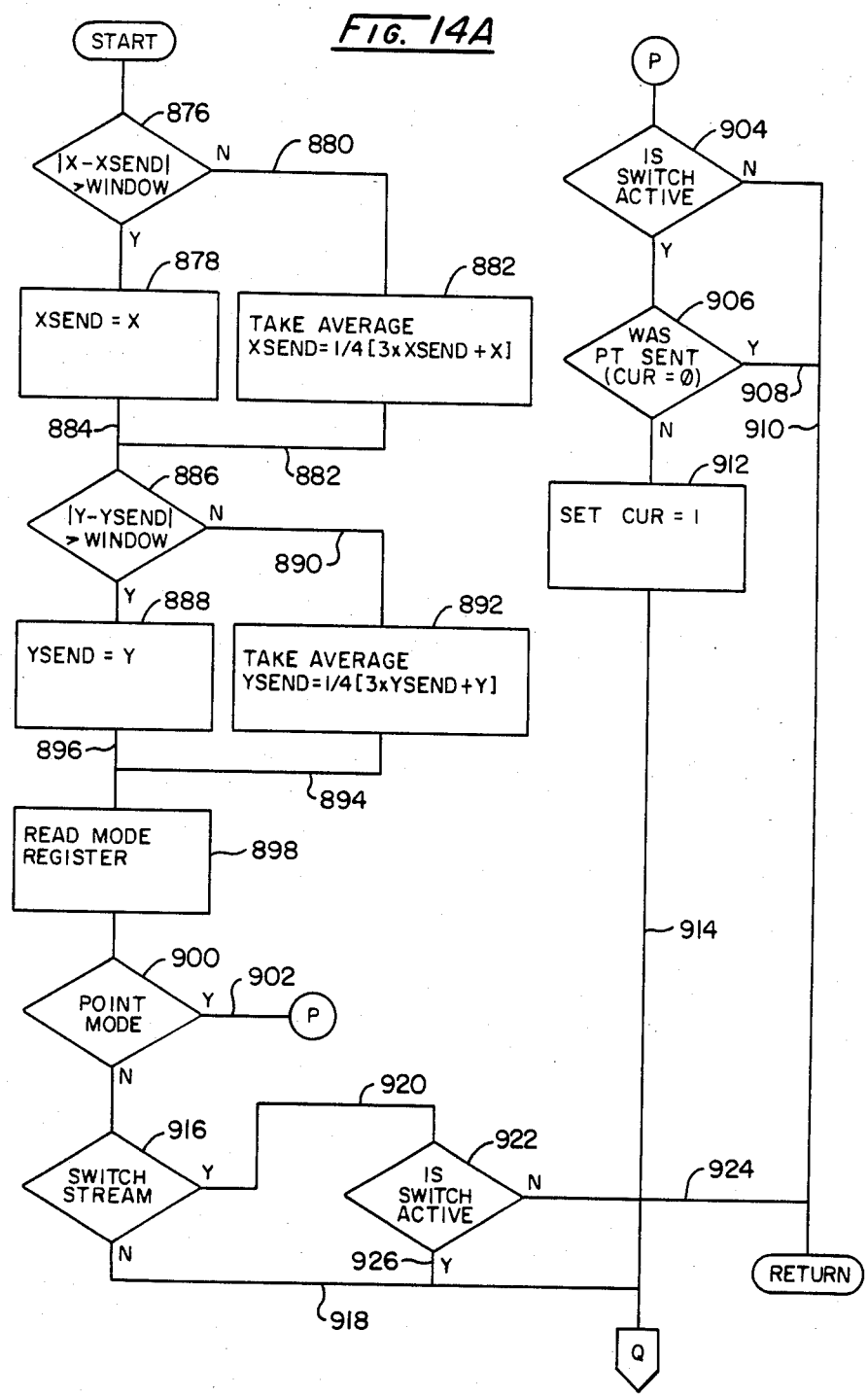

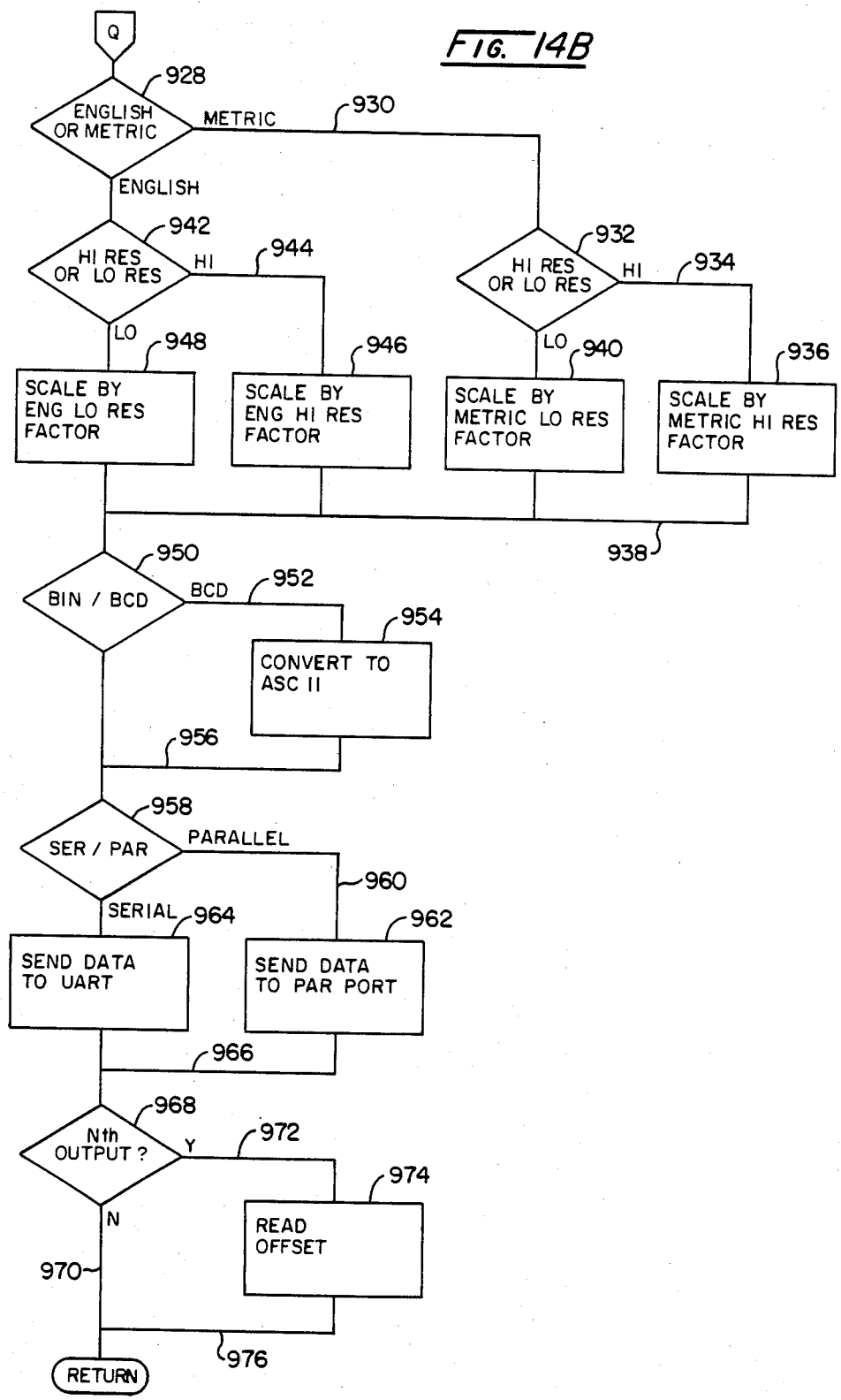

ELECTROGRAPHIC APPARATUS

BACKGROUND OF THE INVENTION

Investigators have developed a variety of technical approaches to the generation of coordinate pair signals from electrographic devices. Industrial requirements for these devices are increasing concomitantly with the evolution of computer graphics, computer aided design and computer aided manufacturing systems. For such utilization, however, the digitizers or graphic tablets constituting such electrographic devices are called upon to perform in an electrically noisy environment. These environments have been observed to generate interfering frequencies, for example, from the synchronizing signals and the like of the visual readout components and of related electronics which necessarily are located in the region of operation of the tablets.

The operation of a digitizer or graphics tablet generally involves the same manual procedures as are employed in conventional graphics design, a stylus or tracer representing a writing instrument being drawn across or selectively positioned upon the digitizer surface. In turn, the electrographic device responds to the position of the stylus to generate analog paired coordinate signals which are digitized and conveyed to a host computer facility.

For the most part, digitizers have been fashioned as composite structures wherein a grid formed of two spaced arrays of mutually orthogonally disposed fine wires is embedded in an insulative carrier. One surface of this structure serves to yieldably receive a stylus input which is converted to coordinate signals. Various methods have been devised for generating coordinate defining signals, as a stylus-grid interaction, for example, a magnetostrictive effect may be established between stylus and grid or a capacitive coupling effect may be evoked between these components.

The use of such grid structures, while providing accurate, linear output coordinate signals, necessarily involves intricate structures which are expensive to fabricate and are prone to damage in the normal course of use. Further, for many applications, it is desirable that the digitizer be fabricated as a highly transparent composite sheet. However, grid formations within the composite structures generally preclude such a transparency feature.

Early investigators have observed the advantage of developing digitizers having writing surfaces formed of a continuous resistive material coating. An immediately recognized advantage for this approach to digitizer design resides in the inherent simplicity of merely providing a resistive surface upon a supportive insulative substrate such as glass or plastic. Further, the substrates and associated resistive coatings may be transparent to permit an expanded range of industrial applications.

The history of development of such resistive coating type devices shows that investigators have encountered a variety of technical problems, one of which being the non-uniform nature of the coordinate readouts achieved with the surfaces. Generally, precise one-to-one correspondence or linearity is required between the actual stylus or tracer position and the resultant coordinate signals. Because the resistive coatings cannot be practically developed without local resistance variations, for example of about ±10%, the non-linear aspects of the otherwise promising design approach have impeded the development of practical devices until recently. However, certain important technical approaches to utilizing the resistive surfaces have been achieved. For example, Turner discloses a border treatment or switching technique in U.S. Pat. No. 3,699,439 entitled "Electrical Probe-Position Responsive Apparatus and Method" issued Oct. 17, 1972, assigned in common herewith. This approach utilizes a direct current form of input to the resistive surface from a hand-held stylus, the tip of which is physically applied to the resistive surface. Schlosser et al. describe still another improvement wherein an a.c. input signal is utilized in conjunction with the devices and signal treatment of the resulting coordinate pair output signal is considerably improved. See U.S. Pat. No. 4,456,787 entitled "Electrographic System and Method", issued June 26, 1984, also assigned in common herewith. Position responsive performance of the resistive layer devices further has been improved by a voltage waveform zero crossing approach and an arrangement wherein a.c. signals are applied to the resistive layer itself to be detected by a stylus or tracer as described in U.S. Pat. No. 4,055,726 by Turner et al. entitled "Electrical Position Resolving by Zero-Crossing Delay" issued Oct. 25, 1977, and also assigned in common herewith.

As the designs of resistive layer surface digitizers now reach a level of technical development permitting their practical implementation, further need has been exhibited for their additional refinement with respect to an enhancement of the signal-to-noise ratio achieved at their outputs, for further refinement of linearity with respect to the accuracy of their performance, for the improvement in ergonomic structuring of their components such as the tracer or "cursor", for the development of noise immunity or suppression in a.c. driven devices while maintaining practical device drive frequencies, and in the minimization of the number of electronic components required for the structuring of the devices to maintain acceptable fabrication cost levels.

SUMMARY

The present invention is addressed to electrographic apparatus for generating coordinate data wherein coordinate positions upon a resistive surface are identified through the use of signals generated from an a.c. source. A solid-state switching architecture for use with the resistive surface is employed which advantageously, significantly lessens the number of switching components required.

To improve performance accuracy of the apparatus, unique treatment of the analog signals developed from the resistive surface is employed. In this regard, a computer regulated automatic gain control is provided to effect uniformity of output even though the operator held stylus or tracer is moved outwardly or inwardly with respect to the resistive surface with which it is used. Further improvement of this gain control is derived from the discovery of a hysteresis characteristic in resistive surface performance during the course of the bi-directional switching procedures associated with its operation. The control over the apparatus detects such hysteresis effects to establish unified gain value elections and thus, improved performance accuracy.

Improved coordinate identification accuracies additionally are achieved with respect to the analog components of the apparatus through the use of an offset measurement technique which is cyclically employed and serves to overcome such adverse phenomena as drift and the like otherwise experienced through the use of typical analog signal treatment components.

The control of the apparatus further improves the read-out performance of output devices associated typically with digitizers. In this regard, jitter which is a noise-induced variation of coordinate pair data, is avoided where the stylus or tracers are maintained in a somewhat stationary orientation through the use of a software filtering technique involving the averaging of successive coordinate signal values. Further, the computerized control of the system permits the evaluation of data for validity with respect to the operation of the locator devices such as tracers or stylus devices within the active or operational regions of the resistive surfaces.

As another feature and object of the invention, electrographic apparatus is provided which includes an insulative substrate which supports a resistive layer which has an operational area extending in an x-coordinate sense between first and second parallel, spaced-apart border regions, and extends in a y-coordinate sense between third and fourth parallel, spaced-apart border regions. A plurality of first, discrete, spaced-apart contacts are electrically coupled with the resistive layer at the first border region, while a plurality of second, discrete, spaced-apart contacts are electrically coupled with the resistive layer at the second border region. Similarly, a plurality of third, discrete, spaced-apart contacts are electrically coupled with the resitive layer at the third border region, while a plurality of fourth, discrete, spaced-apart contacts are electrically coupled with the resistive layer at the fourth border region. The apparatus further includes a circuit arrangement which provides an active electrical circuit function as well as a ground reference. First, discrete, solid-state series switches are provided, each coupled with a select one of the first contacts and which are actuable to a closed condition in response to receipt of a first coordinate logic signal. Second discrete solid-state series switches, each coupled with a select one of the second contacts and actuable to a closed condition in response to receipt of a first coordinate logic signal are provided, while, similarly, third discrete, solid-state series switches, each coupled with a select one of the third contacts and actuable to a closed condition in response to receipt of a second coordinate logic signal are provided. Finally, fourth, discrete, solid-state series switches, each coupled with a select one of the fourth contacts and actuable to a closed condition in response to receipt of the second coordinate logic signal are provided with respect to the resistive layer. A first solid-state directional control switch is coupled in series between the first discrete solid-state series switches, the third discrete solid-state switches and the circuit arrangement which is actuable in response to a first directional logic signal to electrically couple the first and third discrete solid-state switches with the circuit arrangement. A second solid-state directional control switch is coupled in series between the second discrete solid-state series switches, the fourth discrete solid-state series switches and the ground reference and is actuable in response to the noted first directional logic signal to electrically couple the second and fourth discrete solid-state switches with ground reference. A third, solid-state, directional control swich is coupled in series between the second discrete solid-state series switches, the fourth discrete solid-state series switches and the circuit arrangement and is actuable in response to a second directional logic signal to electrically couple the second and fourth discrete solid-state switches with the circuit arrangement. A fourth solid-state directional control switch is coupled in series between the first discrete solid-state series switches, the third discrete solid-stage series switches and the ground reference and is actuable in response to the second directional logic signal to electrically couple the first and third discrete solid-state switches with ground reference. A control arrangement is provided which is coupled with the first, second, third and fourth series switches and the first, second, third, and fourth directional control switches for simultaneously providing the first control logic signal and the first directional logic signal during a first dat mode. The control simultaneously provides the first coordinate logic signal and the second directional logic signal during a second data mode and, simultaneously provides the second coordinate logic signal and the first directional logic signal during a third data mode. Finally, the control simultaneously provides the second coordinate logic signal and the second directional logic signal during a fourth data mode. The apparatus further includes a locator movable into adjacency with the resistive layer for reacting therewith during the first through fourth data modes to provide for the development of x-coordinate and y-coordinate signals.

In one embodiment, the circuit arrangement includes a time variable source and a signal treatment network and the first and third solid-state directional control switches are coupled with the source and the locator is coupled with the signal treatment network.

Another object of the invention is to provide electrographic apparatus which includes a resistive surface of given active area having oppositely disposed border regions. A time varying excitation source of select frequency is provided and additionally a ground reference. A switching arrangement is provided which is controllable for applying the ground reference to one border region of the resistive surface while simultaneously applying the source to the oppositely disposed border region during a first operational mode and for reversing the applications of ground reference and source to the border region during a second operational mode. A locator is provided which is movable in adjacency with and about the resistive surface for effecting capacitive coupling therewith during the first and second operational modes to provide position signals, the locator having a given response characteristic. Signal treatment is provided including an input stage responsive to the position signals for effecting the amplification thereof to provide amplified position signals. A filter is provided for filtering the amplified position signals in correspondence with the frequency elected to provide filtered position signals. Additionally, a gain control is provided to impose an amplitude attenuation of the filtered position signals. A converter network responds to the gain control position signals to provide d.c. level position signals corresponding therewith and a digital converter responds, when actuated, to convert the d.c. level position signals to digital position signals and a control is provided for controlling the switching to provide the first and second operational modes and for providing digital data signals corresponding with the digital position signals. The control further functions to derive the noted gain control input as well as to effect a comparison of the values of the difference of two successive digital data signals with a predetermined reference value to determine a state of movement for the locator and is responsive in the absence of the state of movement to average successively derived digital data signals and subsequently output them so as to avoid jitter effects at the readout.

Another object of the invention is to provide a tracer for utilization with electrographic apparatus which includes a body portion having two oppositely disposed upstanding sides configured for being manually grasped substantially between the thumb and forefinger of an operator's hand and having an axis extending generally parallel with those sides. An electrically conductive annular ring is mounted to and forwardly of the body portion for positioning in adjancency with the resistive layer of the apparatus to effect electrical interaction therewith. Finally, a transparent support is mounted with the ring and has crosshairs thereon intersecting the center of the annular ring, the alignment of these crosshairs being canted with respect to the axis by a predetermined angle selected to normally align the crosshairs vertically and horizontally before the operator when the tracer is naturally grasped in the hand thereof. Preferably, the noted tracer crosshair cant is about 30 degrees with respect to the axis of the device.

Other objects of the invention will, in part, be obvious and will, in part, appear hereinafter.

The invention, accordingly, comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 4 is a schematic representation showing the circuit and switching components of the instant invention;

FIGS. 11A–11C are electrical schematic diagrams of the digital treatment components of the apparatus of the invention;

FIGS. 12A–12L constitute a flow chart describing the main control program of the apparatus of the invention;

FIGS. 14A–14B constitute a flow chart describing the OUTPUT subroutine of the control program of the invention.

DETAILED DESCRIPTION

In the discourse to follow, an electrographic device representing a first embodiment of the invention is described wherein the resistive surface of the digitizer or tablet is excited by an a.c. source, as opposed to the application of such source through a stylus or tracer. However, it should be understood that, with the exception of the selection of excitation frequencies, the same structure and circuitry as is described herein may be utilized with the latter geometry. The noted embodiment wherein the resistive surface itself is excited from an a.c. source provides for an enhanced capability for improved signal-to-noise ratio performance. Where such ratios are improved, otherwise deleterious noise effects can be avoided and more desirable excitation frequencies can be selected for operation of the system.

Figure 1:
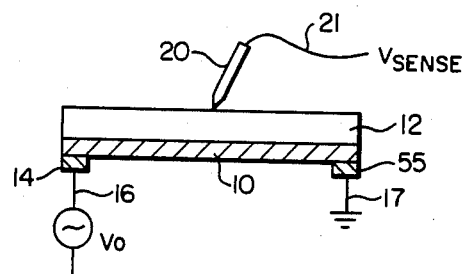
FIG. 1 is a schematic representation of a one-dimensional model of the electrographic apparatus of the invention.
Figure 2:
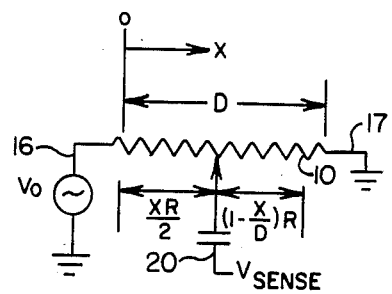
FIG. 2 is a schematic equivalent circuit of the model of FIG. 1.
Figure 3:
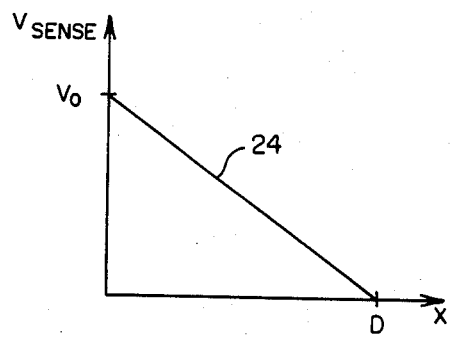
FIG. 3 is a schematic, idealized curve showing voltage distribution across the resistive layer represented in FIG. 1.

As a preliminary consideration of the instant system and apparatus, reference is made to FIGS. 1–3 wherein an idealized one-dimensional model of the digitizing technique of a first embodiment is revealed. In FIG. 1, a resistive sheet, for example, formed of indium-tin-oxide, is represented at 10 over which there is located a dielectric material represented at 12. Electrodes are shown coupled to the resistive sheet 10 at 14 and 15. Electrode 14 is coupled with an a.c. source designated Vo from line 16, while electrode 15 is coupled to ground through line 17. A pick-up, such as a stylus or tracer 20 is positioned adjacent the resistive layer 10 at any given location and through capacitive coupling serves to pick-up a voltage output at a line 21, such voltage being labelled "Vsense". The equivalent circuit for this idealized one-dimensional model is represented in FIG. 2 where the resistive layer 10 is shown as a resistor and the distance of the stylus 20 from the edge of the resistor closest to the source Vo is represented as "X" and the distance between electrodes 14 and 15 is represented as "D". The fraction of resistance of layer 10 extant from the source of voltage excitation to the location, X, may be represented as XR/D, while the distance from the location of the stylus 20 to the opposite electrode 15 may be represented as the labelled (1-X/D)R. The corresponding idealized value for Vsense is shown in FIG. 3 as being linear, as represented at the curve 24. Because of a variety of phenomena such linearity is not readily achieved.

A corresponding one-dimensional model for the above-noted embodiment of the invention wherein the excitation from the voltage source occurs through the stylus is described in detail in the noted U.S. Pat. No. 4,456,787.

To derive signals representing coordinate pairs with respect to the position of stylus or tracer 20 on the resistive surface 10, measurements of the voltage Vsense are made along orthogonally disposed axes designated x and y. Through the utilization of switching, the application of the voltage source as through line 16 and the connection of ground as through line 17 as shown in FIG. 1 are alternately reversed for each of the x and y coordinates. With the values thus obtained for each designated x and y coordinate, a difference/sum voltage ratio is determined to obtain a coordinate position signal.

Referring to FIG. 4, a digitizer apparatus is shown generally in schematic fashion at 28. Apparatus 28 incorporates a switching technique for carrying out a difference/sum ratio coordinate determination. In the figure, a resistive sheet is shown at 30 having a rectangular shape and being accessed by a locator present as a stylus or tracer 32 at some point (x, y). The resistive sheet 30 is shown having designated x+ and x− axes as well as y+ and y− axes the intersection therebetween being essentially at the center of the rectangularly configured sheet 30.

Assuming that the coordinate system shown ranges from +1 to −1 in both the x and y directions, a signal representing any given coordinate (x, y) pair can be determined by measuring the voltage value picked up by stylus or tracer 32 under a procedure where the alternating voltage source or time varying excitation source initially is applied to one edge of the resistive sheet in one coordinate direction while ground reference is applied to the oppositely disposed edge. This procedure then is reversed for the first coordinate direction and the combined readings may be used to determine one coordinate. The procedure then is carried out in the opposite coordinate sense. For example, arbitrarily designating that the output of stylus 32 is to be designated XPLUS when an alternating current source is applied along the x+ coordinate edge of sheet 30 while simultaneously ground is applied to the opposite, x− edge; arbitrarily designating XMINUS to be the signal at stylus 32 when the opposite condition obtains wherein the alternating current source is applied along the x− edge of sheet 30 and ground is applied to the oppositely disposed, x+ edge; designating YPLUS to be the signal at tracer or stylus 32 when the alternating signal source is applied to the edge of resistive sheet 30 at the y+ edge location and ground is applied to the opposite or y− edge; and designating YMINUS to be the signal derived at tracer 32 when the alternating current source is applied along the edge of resistive sheet 30 at the y− edges thereof, while ground is applied along the edges of sheet 30 represented at the y+ coordinate paired coordinate signals may be derived. For example, the signal values may be employed with a difference/sum ratio, to derive paired coordinate signals for any position of the tracer 32 on surface 30 as follows:

$$\text{Position } x = \frac{(XPLUS) - (XMINUS)}{(XPLUS) + (XMINUS)}$$

$$\text{Position } y = \frac{(YPLUS) - (YMINUS)}{(YPLUS) + (YMINUS)}$$

During any of the data collection procedures, one set of coordinate regions or edges of the resistive sheet 30, for example, the y+ and y− edges are permitted to "float" in electrical isolation while the oppositely disposed or, for example the x+, and x− coordinate border regions, are operated upon by alternately applying ground and the a.c. source thereto. The imposition of the a.c. signals as well as application of the ground couplings are carried out through contacts provided as somewhat elongate but spaced apart pads positioned along the borders. FIG. 4 shows an array of four of such pads or contacts along the x+ border at 34, while an oppositely disposed array of such pads for the x− border region is represented at 36. Correspondingly, an array of four spaced apart pads or contacts along the y+ designated border region is shown at 38, while a corresponding array of contacts or pads along the border region designated y− is shown at 40.

Each of the contacts or pads within the array 34 thereof at the x+ border region is connected to one side of a single-pole single-throw analog switch of an array thereof shown at 42. Similarly, each pad or contact of the array 36 at the x− border region is connected to a corresponding a single-pole, single-throw analog switch of an array thereof shown generally at 44. Correspondingly, each pad or contact within the array 38 at the y+ border region is connected to a corresponding single pole, single-throw analog switch of an array thereof shown generally at 46, while the oppositely disposed y− border region contacts or pads of array 40 are each coupled to a corresponding single-pole, single-throw analog switch of an array 48 thereof.

The a.c. source for exciting the resistive surface 30 is represented at 50 having an output at line 52 extending through line 54 to the inputs of two analog single-pole, single-throw switches 56 and 57. The output side of switch 56 is coupled to a bus 58a which, in turn, extends in common to the inputs of each analog switch within arrays 46 and 42. Correspondingly, the output of analog switch 57 extends via bus components 60a and 60b to the common inputs of the analog switches within arrays 44 and 48.

The ground established for operating the digitizer incorporating resistor sheet 30 is derived from line 62 which extends through line 64 to the inputs of two single pole single throw analog switches 66 and 67. The output of switch 66 is coupled to bus component 58b leading through component 58a in common to the inputs of the analog switches within arrays 42 and 46. Similarly, the output of analog switch 67 is coupled to bus commponent 60b which, in turn, is connected in common to the inputs of the analog switches within arrays 48 and 44.

Figure 5:
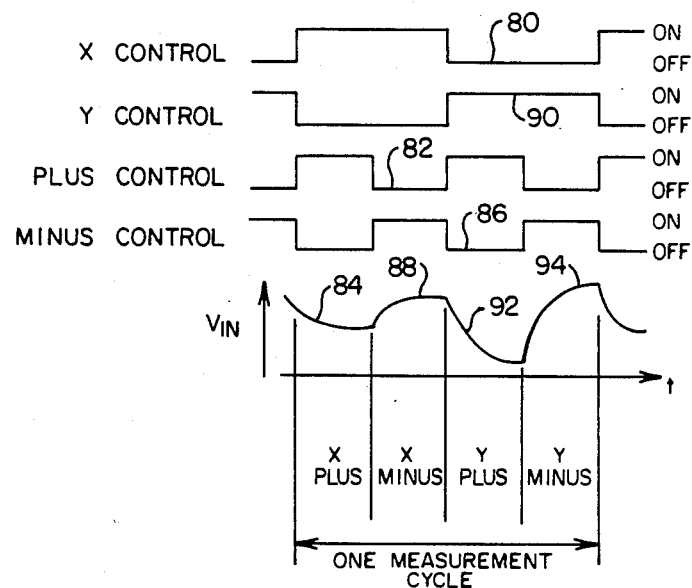
FIG. 5 is a schematic representation of timing and control sequence curves for sequential operational or data modes of the apparatus of the invention.

All the above-described analog switches are actuated by logic compatible voltage signals developed at the output of a central control including a microprocessor as represented at block 70. Thus, by appropriate signal actuation through lines 72 and 73 labelled "X CONTROL" (first coordinate logic signal), all of the switches along the x axis as at arrays 42 and 44 may be closed or opened simultaneously. In similar fashion, the control 70 may assert an actuating signal from along lines 74 and 75, labelled "Y CONTROL" (second coordinate logic signal), to simultaneously open or close all of the switches along the y axis as represented at arrays 46 and 48. Control 70 also may assert simultaneous actuating and deactuating signals from along lines 76 and 77, labelled "PLUS CONTROL" (first directional logic signal) to switches 56 and 67. By such actuation, the a.c. source may be applied to bus 58a through the y+ switch array at 46 and the oppositely disposed y− switch array 48 may be coupled to ground through bus 60b simultaneously. In similar fashion, the control 70 may assert an actuating signal along lines 78 and 79 labelled "MINUS CONTROL" (second directional logic signal) to effect the actuation of switch 57 and passage of a.c. source 50 signals through bus 60b to x− switch array 44, while, simultaneously, connecting the switches of array 42 at the x+ border region with ground through bus 58b. By alteration of the "X CONTROL" and "Y CONTROL" outputs from control 70, the opposite form of actuation may be obtained. In this regard, reference is made to FIG. 5 wherein the modes of operation for carrying out one measurement cycle are illustrated in timing diagrammatic form. Thus, it may be observed that X CONTROL lines 72 and 73 provide an "on" or actuating signal simultaneously with a corresponding on signal at PLUS CONTROL lines 76 and 77 as represented at diagram 82, to develop an X PLUS signal as represented at curve 84 during a first one-quarter interval of one measurement cycle. Similarly, an "on" condition for the X CONTROL signal as represented at diagram 80 is generated in combination with a corresponding "on" actuation signal at MINUS CONTROL lines 78 and 79 as represented at diagram 86. The "X MINUS" signal thus developed is represented at curve 88 and represents the second quarter of the measurement cycle. The third quarter of the measurement cycle is shown developing the "Y PLUS" signal 92 by the assumption of an "on" or actuating status at the Y CONTROL lines 74 and 75 as represented at diagram 90. Simultaneously with this "on" status as represented at diagram 90, the PLUS CONTROL lines 76 and 77 carry an actuating signal as represented by the "on" status at diagram 82. Finally, the "Y MINUS" signal 94 is developed for the fourth quarter with the assertion of an actuating or on status at the Y CONTROL lines 74 and 75, as represented at diagram 90 in combination with a corresponding actuating or on condition at the MINUS CONTROL lines 78 and 79 as represented at diagram 86.

With the arrangement thus depicted, the source 50 is applied first to one border and then the opposite border in an x coordinate direction and subsequently the same arrangement is provided for the y coordinate direction, the switches in the coordinate direction not being employed being open to permit that pair of oppositely disposed borders to "float" and avoid such phenomena as pin cushion distortion. Through the utilization of the noted bus connections, the number of switches otherwise required to carry out this switching logic is advantageously reduced over switching systems requiring two discrete switches for each contact or electrode within the border region arrays thereof. The advantageous reduction in the number of switching components is particularly useful as the size of the tablets carrying resistive areas as at 30 increase in size, inasmuch as the number of required bus connected switches remains the same. Generally, for a tablet typically having a 12 inch×12 inch surface dimension, the number of switches required will be reduced by 40 percent over earlier designs and this reduction becomes more significant as the size of the tablets increase.

Generally, the resistance layer as at 30 will have a resistance selected in a value range of about 100 to 10,000 ohms per square. However, because of frequently encountered interference phenomena, for example from the operator's hand or portion of the body touching the surface or coming close to it, lower resistance values are preferred. However, from the standpoint of avoiding the phenomena of stray capacitance or environmental noise input, it is desirable that this resistance value be as low as possible, 250 to 500 ohms per square being considered most appropriate. The terms "resistive sheet", "resistive layer" and "resistive surface" for the component 30 have been used somewhat interchangeably in the instant discourse. The terms are intended to connote the conventional meaning of "layer" as that which is laid on any surface, a stratum, a bed of thickness, or the like. In some applications, to achieve desired resistivity values, the technique of providing discontinuities in the layer, as described in U.S. Pat. No. 4,198,539, may be employed. The selection of frequency for the source 50 also is a matter of consideration with respect to the avoidance of interfering frequency levels most constantly encountered in typical uses of the digitizer devices such as at 28. As an initial consideration, excitation signals below about 5 KHz are undesirable because of the very poor capacitive coupling between the tracer or stylus 32 and surface 30. However, for excitation signals above about 2 MHz, the cost of electronic components treating such frequencies becomes undesirably high. Further, at medium frequency ranges, for example at about 200 KHz, interference may be encountered from devices normally associated with the environment of digitizers. In this regard, harmonics from visual display terminals (VDT) at about 200 KHz have been witnessed, such interfering signals being developed from synchronization pulses and the like.

In general, the control at block 70 containing a microprocessor and related components may be characterized as treating signals in a digital format. However, the inputs to the control 70 from which digital coordinate pair information is developed are pre-treated in analog fashion. In this regard, note that the locator or pick-up 32 is coupled by shielded cable 96 which is directed to the input of an impedance matching network represented at block 98 and an associated pre-amplification stage 100. The pre-amplification stage has R-C networks at its feedback and input which are varied to achieve optimal input matching amplified position signals being derived from this stage. In effect, the distributed resistance of sheet 30 and the gap defined capacitive coupling at the pick-up 32 exhibit the transfer function of an R-C network. It is necessary to direct the signal output of that network into a corresponding matched network which has the inverse of that transfer function to achieve an optimal coupling.

Because the quality of coupling between the pick-up at 32 and resistive sheet 30 varies with the type of pick-up utilized, it further is necessary to achieve a constancy of the received position signal to provide for uniform processing. For example, where a tracer or cursor incorporates a flat receiver ring which is positioned about the coordinate point of interest. It has been found that the coupling achieved thereby is excellent. Conversely, where a pointed stylus is used as the signal pick-up, a coupling of lesser quality is achieved. Thus, by appropriately coding the attachment of cable 96 with the preliminary signal treatment stages, an automatic attenuation of the received signal corresponding with the pick-up selected may be provided and this variable or selective attenuation of the received signal is represented at block 102. Upon being adjusted at stage 102, the signal then is filtered at a band pass filter represented at block 104 which is structured in accordance with the frequency of excitation at the source 50 and which provides filtered position signals.

Because variations in the distance above the surface of resistor sheet 30 of tracer or pick-up 32, the system provides an automatic gain control represented at block 106. This automatic gain control over the signal is controlled from the control function represented at block 70 through an association represented by line 108. Following the automatic gain control stage 106, the resultant gain controlled position signals are converted to a d.c. level as represented at block 110. The signal then is directed to the input of a sample and hold circuit represented at block 112. Circuit 112 serves to capture the voltage applied at its input and provides a degree of what may be termed as "software freedom" wherein the operation of the microprocessor containing control 70 may be somewhat deactivated or held in a tight loop wherein the noise level of the digital components of the system is significantly reduced during initial analog signal capture. This permits the analog components of the system to operate in a more quiet electronic environment. Thus, at such time as the d.c. level data (d.c. level position signals) are developed, such level information then is retrieved from the sample and hold circuit 112 to be converted to a digital binary value by an A/D conversion circuit represented at block 114. The thus-developed digital valuation (digital position signals) at circuit 114 is directed via a multi-lead bus to the control at 70 as represented at line 116.

Upon receipt of the digital position signals from bus 116, the control function represented at block 70 carries out the earlier-discussed difference/sum ratio developmment, accommodates for amplification offset and corrects for non-linearities occasioned by variations in the coatings at resistive layer 30. The resultant coordinate pair or digital data signal outputs may be provided in serial fashion at a serial port represented at line 118 or in parallel fashion as represented at line 120. These outputs are coupled then with a host computer facility.

As indicated earlier herein, a first structuring for the digitizer apparatus 28 is as illustrated wherein the resistive sheet 30 is excited from an a.c. source. Improved signal-to-noise ratios are achieved with this arrangement. However, the system also will work where the cable 96 of pick-up 32 is coupled to the source 50 and injects a signal at a desired coordinate location. For operation in this architecture, line 52 will be coupled to the analog or signal pretreatment components commencing with block 98.

Figure 6:
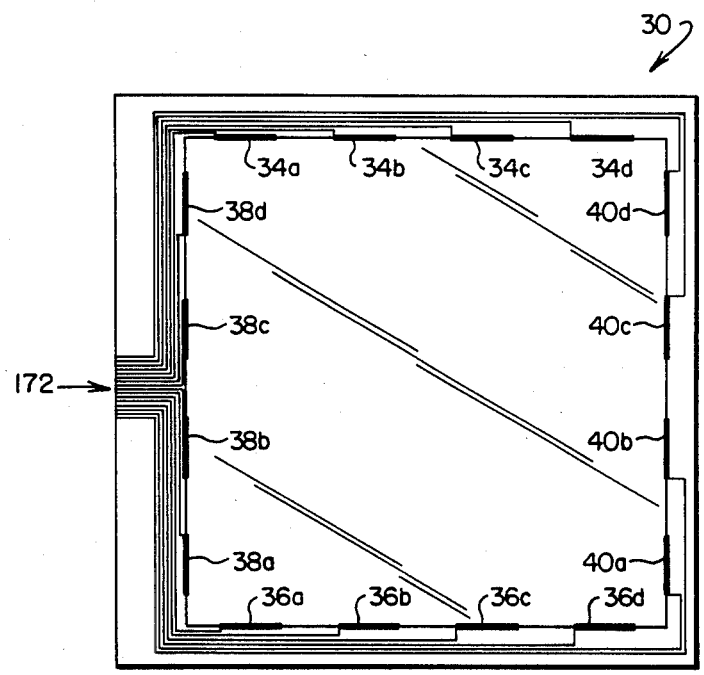
FIG. 6 is a plan view of an electrographic tablet employing the invention described in the instant application.

Referring to FIG. 6, a preferred structuring for the resistive sheet 30 is revealed. Preferably, the surface 30 is formed by a process wherein an indium-tin-oxide (ITO) layer is formed upon a dielectric supporting substrate, for example glass. The outer border region of the composite of glass and ITO then is etched to provide an ITO region of rectangular peripheral extent larger than the anticipated active writing area by about a 4 cm extent. This leaves a glass region suited for supporting printed circuit leads represented by the array 172. These leads may be silk screened over the glass portion using, for example, a silver ink. Note that one each of the leads extends to the pads or electrodes within the ITO region. An array of four pads for each border region again are shown in FIG. 6 and are individually identified using the same array identification shown in FIG. 4 in conjunction with an alphabetical suffix. The reason for utilizing an ITO surface extent larger than the actual active writing area resides in the necessary diametric extent of the tracers which may be utilized with the surface 30.

Figure 7A:
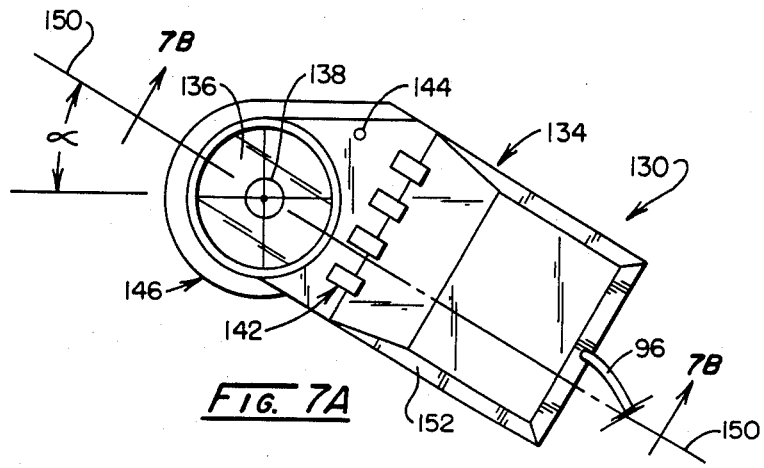
FIG. 7A is a top view of a tracer or locator according to the invention.
Figure 7B:
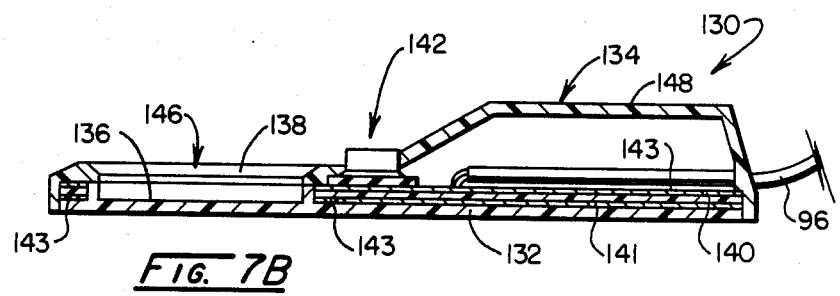
FIG. 7B is a sectional view taken through the plane 7B—7B of FIG. 7A.
Figure 7C:
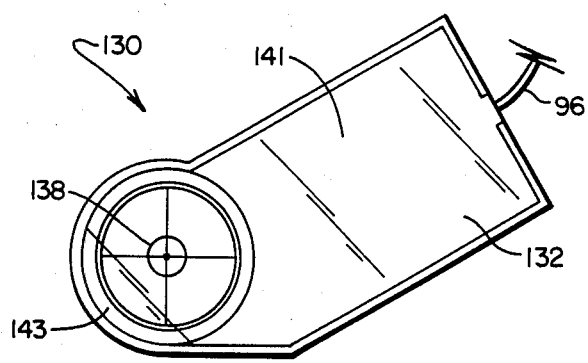
FIG. 7C is a bottom view of the tracer of FIG. 7A.

Referring additionally to FIGS. 7A-7C, a hand-held tracer is represented generally at 130. As seen in FIGS. 7B and 7C, the tracer 130 includes a transparent plastic base sheet member 132 which is nestably secured within a single molded top housing portion which is represented in general at 134. Formed, for example, of transparent acrylic, the forward portion 136 of the transparent base is configured having cross-hairs and a sighting circle which may be observed at 138 in FIGS. 7A and 7C. This sighting circle 138 and the cross-hairs serve to aid the operator in positioning the device 130 at appropriate locations over the resistive surface 30. As shown in FIG. 7B, adhesively attached to the base sheet member 132 is a printed circuit board 140, the bottom surface of which at 141 may be observed in conjunction with the bottom view of device 130 in FIG. 7C. The conductive surface of side 141 of the printed circuit board 140 includes an annular ring 143 which may be utilized for reception in the case of the first embodiment above disclosed or for transmission of a.c. signals for the alternate embodiment of the invention. The upwardly disposed surface of printed circuit board 140 is shown in FIG. 7B at 143 and this surface contains leads coupling the annular ring to shielded cable 96 as well as leads providing connection to and forming part of an array of finger actuated switches 142. Each of the switches at array 142 may be, for example, provided as an elastomeric, over-center type having a positive tactile feedback when actuated. Each switch completes contact with a corresponding contact pair formed within the printed circuit at 143. The tracer 130 further carries a light emitting diode 144 which will be seen to be illuminated at such time as data representing a coordinate pair is received and accepted by the host computer facility with which the apparatus 28 is operationally associated. The switches 142 may have any of a variety of designations, for example representing the development of coordinate data for a series of variously colored printouts. Of particular importance in the design of the tracer 130, however, is the inclination of the forward, cross hair containing portion thereof 146 with respect to the elevated hand gripping portion 148. In this regard, the grip or body portion 148 may be considered to have a longitudinal axis represented at line 150. However, the forward portion 146 is canted by an amount of about 30° with respect to that axis 150. With this arrangement, as the tracer 130 is gripped between the thumb and forefinger such that the user's thumb is against side 152, the cross hairs at 136 will be arranged vertically and horizontally before such user in the ergonomically most desirable orientation. For example, should that forward portion 146 be extended in alignment with axis 150, then the natural inclination of the operator's right hand will be one exhibiting a slight strain. The orientation of forward portion 146 is canted in the opposite direction for left-hand utilization. It further may be observed that the body portion 148, being elevated and formed with inwardly canting sides, nests supportively and comfortably in the palm of the user's hand to avoid fatigue. It may be noted from the size of the annular ring 143 that the active writing area for the resistive sheet 30 must be positioned about 4 cm inwardly from the actual edge of the ITO layer to avoid distortion due to edge effects and the like.

Figure 8A:
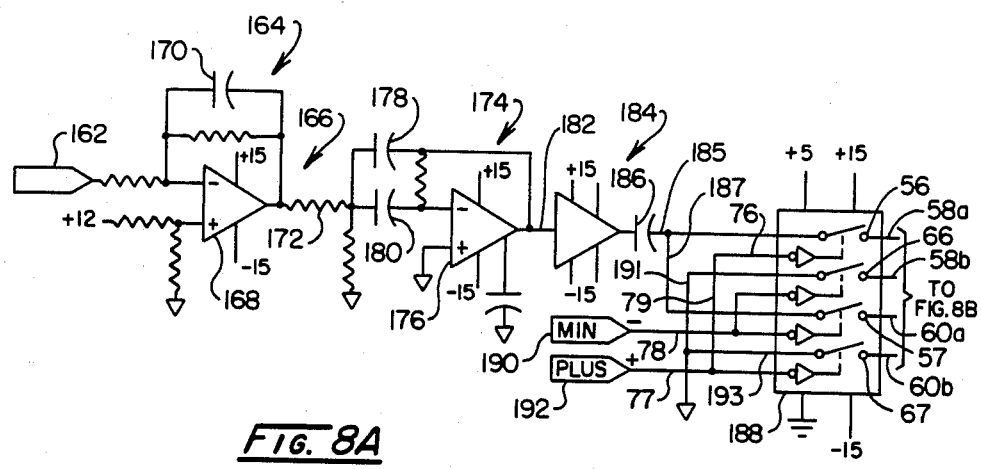
FIGS. 8A–8B are schematic drawings of the drive and switching electronic components of the apparatus of the invention.
Figure 8B:
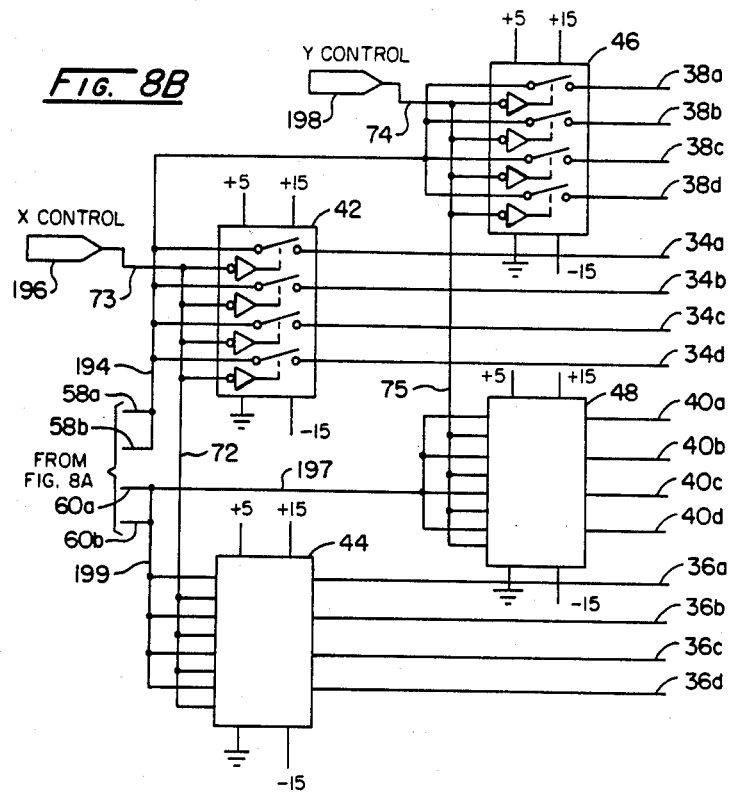

Now looking to the above-discussed circuit at an enhanced level of detail, reference is made to FIGS. 8A and 8B elaborating upon the swtiching system described in conjunction with FIG. 4. Where appropriate, the same component numeration is retained in this more detailed discourse. The oscillatory signal which is developed in conjunction with the a.c. source 50 is derived from the control 70 as a squarewave and is introduced via connector 162 to a signal treatment network represented generally at 164. For the preferred embodiment wherein the resistive surface 30 is excited, the frequency value asserted at connector 162 will be about 211 KHz. On the other hand, where the surface 30 is used in conjunction with a mode wherein excitation occurs through the stylus or tracer, then that frequency value essentially would be doubled. The initial stage of network 164, as shown at 166, utilizes an operational amplifier 168 which is configured by capacitor 170 as an integrator serving to remove initial harshness or harmonic content from the squarewaveform which normally will run from 0 to 5 v. The stage also serves to center the waveform so as to run ±2 v in symmetrical fashion. The thus treated signal then is directed through a resistor 172 to a band pass filtering stage represented generally at 174. In this regard, the filter stage 174 includes an operational amplifier 176 configured in typical filter fashion utilizing capacitors 178 and 180. A band pass filtering stage is used at this location in the signal treatment network 164 first to remove all harmonics and next to eliminate any d.c. biases which may evolve from the first stage 166. Generally, the stage 174 has a Q of 10 centered at the noted 211 KHz base frequency inputted at connector 162. The output of stage 174 at line 182 is directed to the input of a current driver stage represented generally at 184. Provided, for example, as a type LH002 current driver, the stage 184 serves to drive the impedance of resistive surface 30 and, in effect, serves as a buffer stage. The output of driver stage 184 is shown coupled through capacitor 186 and line 185 to the initial two of the earlier-described switching stages 56 and 57 through lines 185 and 187. Switches 56 and 57 are seen to be of an analog variety and are combined with earlier-described switches 66 and 67 in a quad package thereof represented at 188. Control over switch 57 is carried out from the control function 70 by selective assertion of a logic compatible voltage signal from line 78 through a connector 190, while corresponding control over switch 56 is provided from the control 70 through lines 76 and 77 carring a signal from connector 192. In similar fashion, switch 66 is selectively coupled to ground via line 191 and is controlled by the assertion of a logic compatible voltage signal from line 79 coupled through line 78 to connector 190. Finally, switch 67 is selectively coupled to ground through lines 193 and 191 and is controlled from line 77 which is, in turn, coupled through connector 192 to control 70.

Figure 9A:
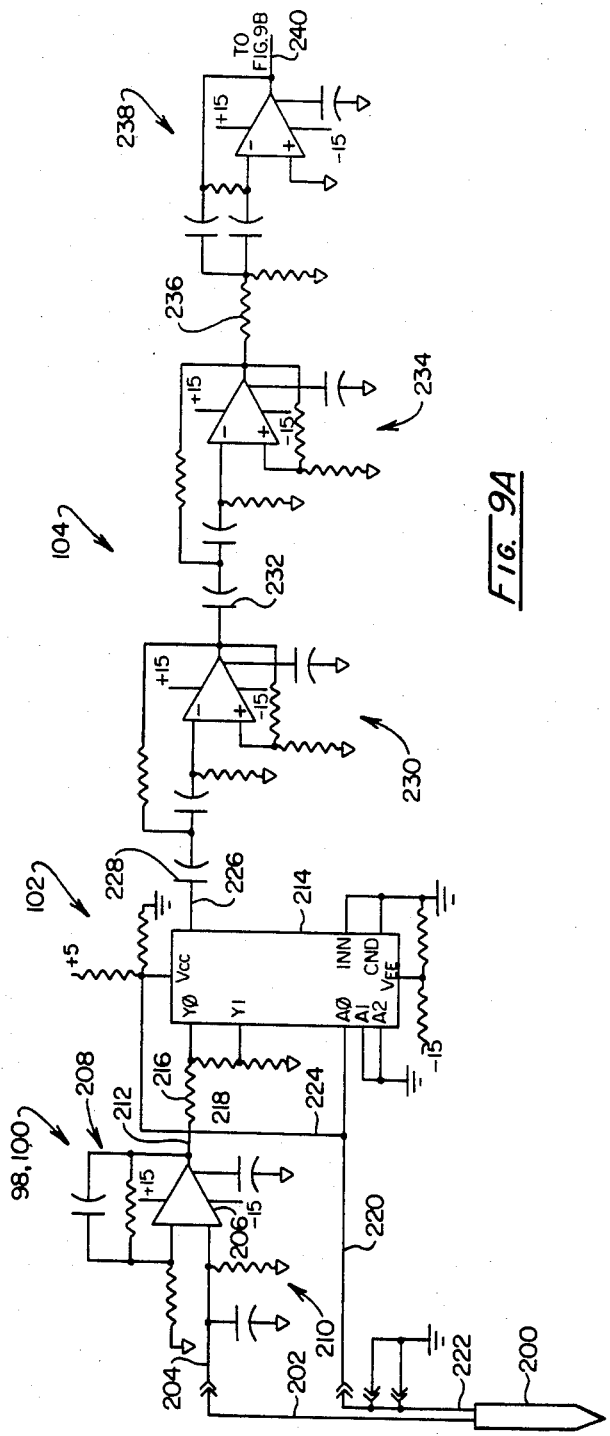
FIGS. 9A–9C are electrical schematic diagrams showing the analog treatment components of the apparatus of the invention.
Figure 9B:
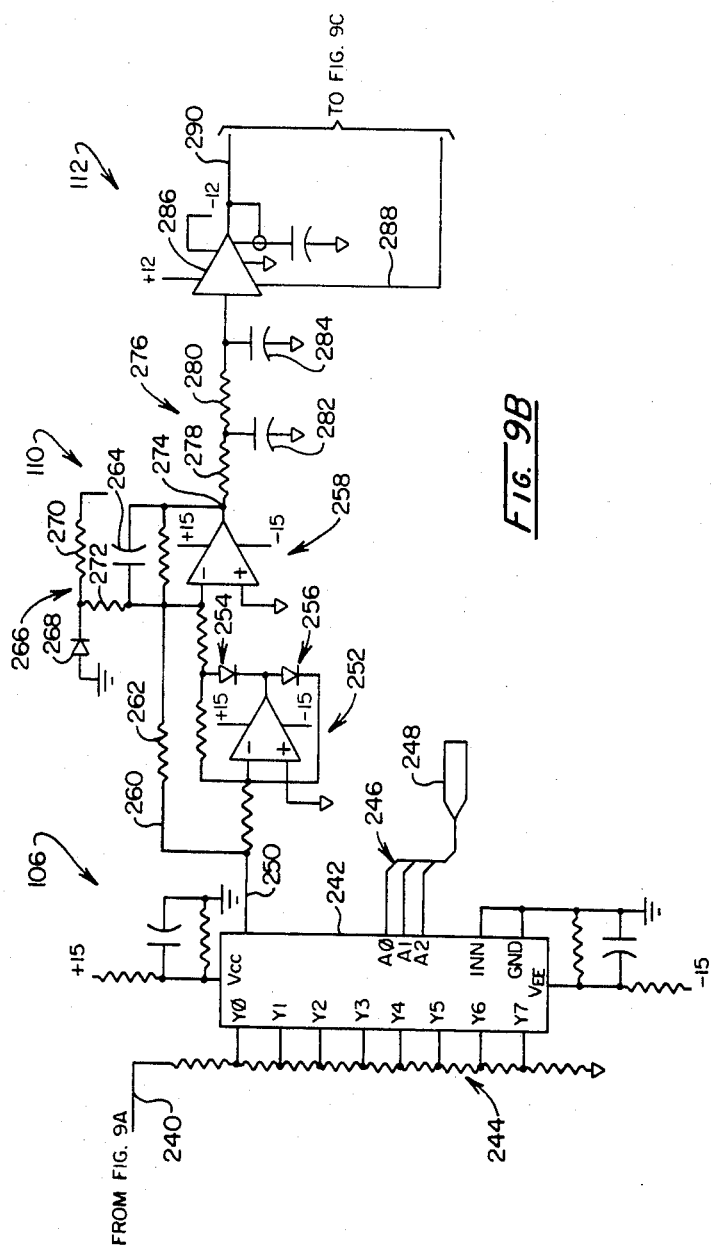
Figure 9C:
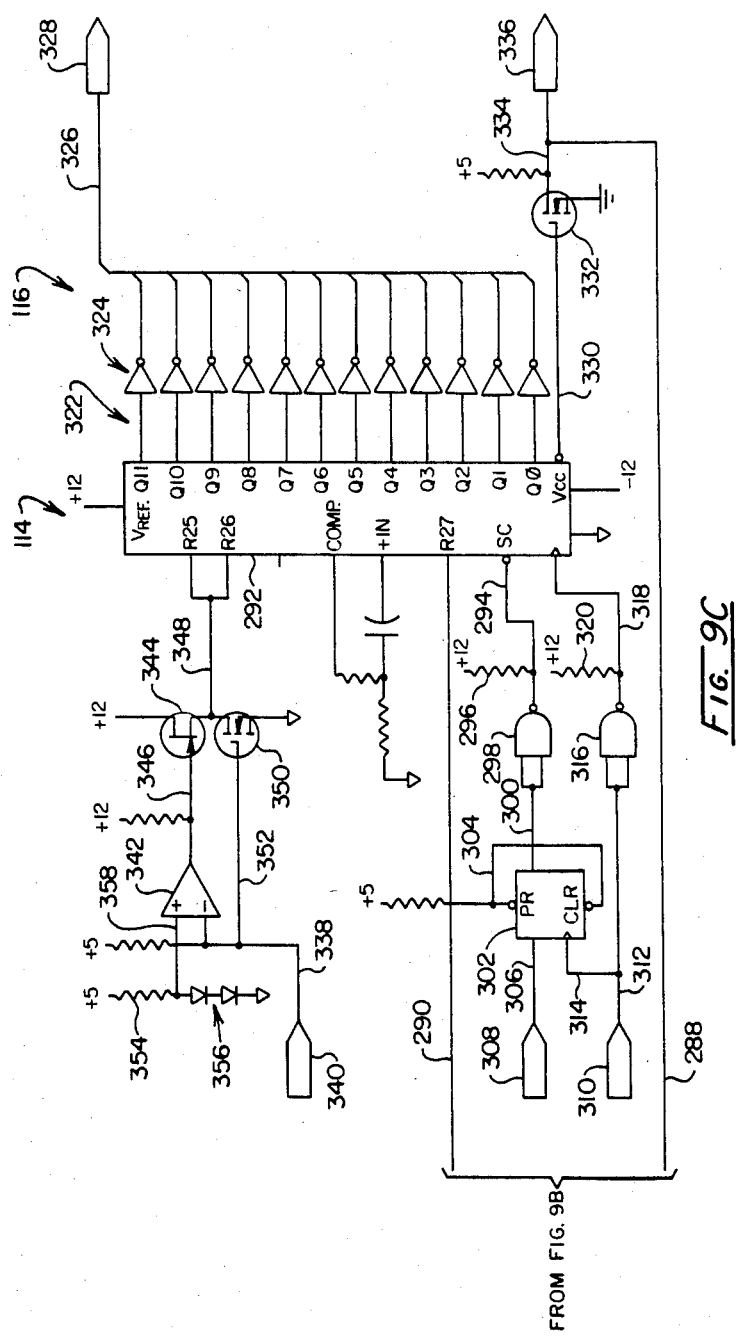

Looking additionally to FIG. 8B, it may be observed that the a.c. excitation signal is directed selectively through switch 56 and line 58 to line 194 and thence to the switching outputs of switch array 42 having outputs connected, as shown, to contacts or pads 34a–34d (FIG. 6). Switch array 42 selectively receives a logic compatible voltage signal from the control 70 through connector 196 and combined line 73 and 72. It may be recalled that such switching activates the x+ coordinate border region to receive a.c. excitation. In similar fashion, switch 57 supplies a.c. excitation signals through lines 60a and 197 to quad switch array 48 in conjunction with the development of y− coordinate information. Control over the four switches of array 48 is provided from control 70 through lines 74 and 75 and its YCONTROL connector 198. Similarly, line 60a is directed to line 199 and to the inputs of the switch array 44 providing for X− coordinate excitation of resistive sheet 30. Switch array 44 is, in turn, controlled from lines 72 and 73 and the XCONTROL input as represented at connector 196 from control 70. The ground coupling to switch arrays 44 and 48 is provided from line 60b emanating from switch 67 which is selectively actuated from control 70 through connector 192. Referring to FIGS. 9A–9C, the analog signal treating components of the apparatus 28 are revealed in detail. These figures should be considered in side-by-side adjacency in their alphabetical sequence as represented by the connecting labels thereon. The output of the tracer or stylus as described as pick-up 32 in FIG. 4 is coupled as shown in FIG. 9A through a connector 200 and line 202 to input line 204 of the combined preamplification and impedance matching network described earlier at 98 and 100. Preamplification stage 100 is comprised of an operational amplifier 206 having RC networks 208 and 210 in its respective feedback and input paths. As discussed above, it is important to achieve an impedance matching between the signal pick-up device and the input of the analog circuitry. With one embodiment of the invention, desirable signal-to-noise ratios are achieved with the pick-up 32 operating in a receiving mode, inasmuch as the pick-up device itself is a high impedance device and it is being driven through a capacitive coupling with the resistive surface 30 itself. Conversely, when the exciting signal is generated through the tracer or stylus, the capacitive coupling at the resistive surface represents a high impedance that becomes a voltage drop in conjunction with a system wherein a relatively small signal is being injected at surface 30. Thus, undesirable signal loss occurs across the coupling.

Because the coupling between resistive surface 30 and a stylus is not of the quality as a corresponding coupling utilizing a tracer as described in conjunction with FIGS. 7A–7C, a selective attenuation is required with respect to the preamplified signal developed at output line 212 of stage 100. To provide this selective attenuation, a type 4051 analog switch is employed as represented at 214. The input to this circuit from line 212 is provided through resistor 216 which is directed either to input pin Y0 or pin Y1 coupled to resistor 218. Thus, where a tracer as described in conjunction with FIGS. 7A–7C is provided, line 220, extending to the A0 terminal, will not be grounded from line 222 and a +5 v signal will be impressed at line 220 from line 224 to provide for the receipt of signals from line 212 through the Y1 terminal to be attenuated accordingly and presented at output line 226. On the other hand, where a stylus is utilized, then line 220 is coupled to ground from connection line 222 and an unattenuated signal is received from line 212 into terminal Y0 for presentation at output line 226.

Output line 226 is coupled through capacitor 228 to band pass filtering network 104. Generally, the network 104 includes a high pass filter stage 230 providing a very sharp leading filter edge which is coupled in cascade fashion through capacitor 232 with a band pass stage 234. Each of the stages 230 and 234 does one pole realization and the output of the stages at line 236 is directed to a filter stage 238 which is structured in substantially identical fashion as earlier described filter stage 174 (FIG. 8A). Generally, the stages 230, 234 and 238 are configured about operational amplifiers of type LF356 for the preferred embodiment of the invention. However, where higher frequencies, for example in the range of 400 KHz are utilized (for configurations wherein the tracer or stylus injects a.c. signals to resistive sheet 30) then type 2625 operational amplifiers preferably are employed.

The output of the band pass filter 104 at line 240 is directed to the input of automatic gain control stage 106 as seen in FIG. 9B. This automatic gain control is utilized inasmuch as there is a wide dynamic range of signals asserted at the input to the analog portion of the instant circuit. Such range of signal variation is occasioned by the variations in elevation of the tracer or stylus 32 over the resistive sheet 30 during use, as well as variations in the interposition of dielectric material such as paper and the like between the pick-up device and the resistive surface 30. Because the signals ultimately are converted to digital form, the imposition of a gain control is necessitated. To provide this gain control, a selector network 242 is employed which may be, for example, a type 4051. The Y0–Y7 input terminals of the network 242 provide taps into a resistor network 244 the input to which is coupled to line 240. By asserting an appropriate binary control at terminals A0–A2 from leads 246 and connector 248, the control 70 may elect or tap the resistor network at any of the input terminals Y0–Y7 to provide the thus-selectively attenuated signal at output line 250. Network 242 also may be controlled to assert a ground level signal at line 230 for purposes of offset measurement. Because of a hysteresis characteristic evidenced in such devices as at 242, it will be observed that the program electing the appropriate tap is adjusted accordingly.

Output line 250, carrying a gain adjusted signal, is directed to the input of a full-wave precision rectifier network represented at 110. Rectifier network 10 is comprised of two stages, the initial stage at 252 including diodes 254 and 256 at the output thereof to provide half-wave rectification. This half-wave rectified signal then is directed to the second stage 258 having a feedback including line 260 and resistor 262 to evolve full-wave rectification. Averaging is provided through the inclusion of capacitor 264.

Stage 110 further includes an offset biasing network 266 including diode 268 and resistors 270 and 272. This network is coupled to line 260 and serves to assert a positive bias upon all of the d.c. levels in the analog signal treating system thus far described. All of the active components of the system have a certain offset voltage which will constitute an error. Because that voltage may have a negative value and the subsequently encountered analog-to-digital converter devices can only convert positive values, an assurance of the latter positive value is provided by his arrangement which then is accommodated in the overall control program of the system. For example, the input at line 204 can be grounded and the voltage ultimately evolved converted to a digital level which can be assessed and assigned as an error a subtractive correction. Stages 252 and 258 may be structured utilizing conventional type LF356 operational amplifiers.

The output of the converter network 110 at line 274 is directed through a two-pole low pass filter represented generally at 276 comprised of resistors 278 and 280 operating in conjunction with respective capacitors 282 and 284. The thus-filtered output then is directed to a sample and hold network 112 having as its principal component an integrated sample and hold circuit 286 which, for example, may be provided as a type LF398 and which is selectively actuated to hold the signal at its input from line 288 extending to the control 70. Serving advantageously as a stage isolating the relatively noisy activities of the microprocessor or digital components of the system from the analog or positional signal generation and receiving components, the output of the sample and hold circuit 286 at line 290 is directed in controlled fashion to the R27 terminal input of analog-to-digital converter circuit 292 of conversion circuit 114 as represented in FIG. 9C. Powered at a ±12 v level, the converter 292 commences carrying out a conversion of the signal at line 240 upon receipt of an appropriate start convert signal at its SC terminal from line 294. Line 294 is held at +12 v through pull-up resistor 296 which level is buffered by a type 74LS38 open collector buffer 298 which receives its common input from line 300 extending, in turn, to a flip-flop 302 which may, for example, be a type 74HC$_{74}$. The clear, CLR, terminal of flip-flop 302 is maintained at a logic high by line 304 and the device is triggered by a start convert signal at its input line 306 which is coupled to control 70, as represented by connector 308. The flip-flop 302 functions to synchronize the converter 292 with the clock of control 70 and this is carried out by presenting a 102.4 kHz signal input to the flip-flop from control 70 as represented by connector 310 and lines 312 and 314 extending to the opposite input thereto. The signal imposed at line 294 is not a continuous logic level inasmuch as the signal causing the commencement of conversion is cleared by the continuously running clock at line 314 asserted at the flip-flop 302. It may be noted that line 312 also provides a clock input to the converter 292 through connection with open collector buffer 316 and line 318 which is held normally high by pull-up resistor 320 coupled to +12 v.

The 12-bit conversion output of converter 292 is present at its Q0–Q11 parallel outputs as represented by line array 322. The output lines within array 322 are individually converted to five volt logic by type 74C901 buffers coupled thereto as at the array thereof shown at 324. The resultant parallel 12-bit output is directed to a data bus 326 for return to the control 70 as represented by connector 328. At such time as any conversion is completed by converter 292, the output terminal V-cc at line 330 assumes an active logic low status which active low is converted from 12 volt to 5 volt logic levels by field effect transistor 332. Transistor 332 presents the signal line 334 which is directed to the control 70 as represented by connector 336. Note that line 288 is coupled to the same connector through connection with line 334. Transistor 332 may, for example, be present as a type SD1117N. When line 294 assumes an active logic low, then the V-CC terminal at line 330 follows by going high in acknowledgment of the commecement of conversion. Upon being converted to a lower level by transistor 332, the resultant signal is returned to sample and hold circuit 286 to hold the signal at line 290. At the completion of a digital conversion, the signal at terminal V-CC at line 330 assumes an active low logic level which is witnessed at line 334 and which is poled by the control 70. In effect, this is a data ready signal. The same logic level change is witnessed at line 288 and at the sample and hold network 286.

Where resistive sheet 30 is used, for example, in conjunction with a 12 inch×12 inch active area format, a 13-bit A/D conversion is required of the 12-bit converter component 292. To develop this thirteenth bit, the normally 8 v full scale signal at input line 290 is treated by reference within the converter itself to be either in a 0 to 4 v or 4 to 8 v range over which a 12-bit conversion is made. The control 70 determines whether the signal at line 290 is below 4 v and if that is the case, a thirteenth bit is assumed to be 0. Where the signal at line 290 above 4 v, then an additional conversion is carried out wherein the reference in the converter 292 is altered and a thirteenth bit is generated. This determination is made through the utilization of internal resistances within converter 292 as accessed from terminals R25 and R26. These terminals are connected either to ground or +12 v in dependence of the need for the thirteenth bit in the higher voltage range. Upon control 70 determining whether the input at line 290 is above or below the noted half scale or 4 volts. This being the case, a signal is presented at line 338 from connector 340 to one side of a typ LM339 comparator 342. Comparator 342 provides a level shifting from the computer logic to the ±12 v levels of the converter 292. Accordingly, with the noted signal at the negative input to comparator 342, a type J111 FET the gate of which is coupled to the output of comparator 342 through line 346 will be activated to provide a +12 v association with the resistors coupled through line 348 to the R25 and R26 terminals of converter 292. Conversely, the internal resistors are coupled to ground by virtue of the signal at line 338 being conveyed to FET 350 in consequence of the signal at line 352. As is apparent, the opposite input to comparator 342 is adjusted by resistor 354 and diode pair 356 coupled thereto through line 358.

Figure 10:
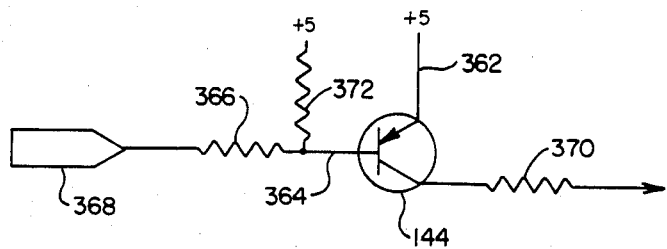
FIG. 10 is a schematic circuit drawing showing the LED drive circuit of the apparatus of the invention.

Looking to FIG. 10, a small network for activating the light emitting component 144 on the tracer embodiment shown in FIG. 7 is revealed. Component 144 may, for example, be a type MPS2907 having its emitter connected to +5 v as represented at line 362 and its base coupled through line 364 and resistor 366 to control 70 as represented by connector 368. The collector of transistor 144 is coupled through resistor 370 to a power supply ground, while the base connecting line 364 is coupled to +5 v through pull-up resistor 372. As is apparent, when line 364 assumes an active low status, the component 144 is illuminated.

Referring to FIGS. 11A-11C, the digital components of the circuit of the digitizer 28 are revealed in enhanced detail. These figures should be positioned in adjacency in alphabetical order as represented by the connective labels thereon. Looking initially to the centrally positioned FIG. 11B, the microprocessor under which the circuit operates is represented at 380. The the microprocessor shown is a type 8085, it is considered that a type 8088 of slightly improved capability is to be preferred for the instant application. The microprocessor 380 is driven at its X1 and X2 terminals from a crystal controlled oscillator 382 deriving a 6.5536 MHz output. In consequence, the clock, CLK, terminal thereof provides a corresponding output at lines 384 and 385 which is coupled to the input of a divide by four counter 386 (FIG. 11A). One of the four outputs of counter 386 is tapped at line 388 which is coupled to earlier-described connector 162 (here shown primed) to provide the approximately 409.6 KHz squarewave input to the excitation filter stage described in FIG. 8A at 164 for the embodiment of the invention wherein excitation is injected into surface 30 via tracer or stylus 32. On the other hand, for the first embodiment, the counter 386 is tapped at line 390 leading to line 392 and the same connector 162 for developing the 204.8 KHz frequency signal desired for the instant preferred embodiment wherein the resistive surface 30 itself is excited. Line 390 also is directed to the input of another divide by four counter 394, the output of which is tapped at line 396 leading to connector 310 described in conjunction with flip-flop 302 in FIG. 9C. The frequency of the output signal at connector 310 will be recalled to be 102.4 KHz. Another output of counter 394 is provided at line 398 which is directed to the "TIMER In" terminal of a composite random access memory (RAM) and timer circuit 400 (FIG. 11B) which may, for example, be provided as a type 8155H. Composite circuit 400 additionally provides 12 bits of input/output port function for utilization by the microprocessor 380. To effect their control association, the commonly labelled IO/M, ALE, RD, WR, and RST terminals of composite circuit 400 and the microprocessor 380 are coupled in common. Note that these common connections are coupled with +5 v supply through an array of discrete pull-up resistors 401. The RAM input terminals PA2-PA7 and PB0-PB6 of circuit 400 are coupled with bus 326 which, in turn, is directed to connector 328 for receiving the parallel digital output of analog-to-digital converter 292 (FIG. 9C). The address/data terminals AD0-AD7 of circuit 400 are coupled via common address/data bus 402 to the corresponding ports of microprocessor 380 as well as to the corresponding data ports D0-D7 of a universal asynchronous receiver transmmiter (UART) 404. Terminals PC0 and PC1 of circuit 400 are coupled to respective connectors 368 and 340 which, in turn, actuates LED 144 (FIG. 10) and provide bit 13 information to converter 292 (FIG. 9C). As noted earlier herein, LED 144 is energized only when a coordinate pair signal has been transmitted to the host computer. Bus 402 is shown to continue to an array of discrete pull-up resistors 406 coupled to +5 v supply (FIG. 11A). Bus 402 additionally is coupled, as represented by connector line 408, to a continuation of the bus at 410, one component of which is directed to the output terminals 00-07 of a programmable read only memory (PROM) 412. PROM 412 may be provided, for example, as a type 2764. The device is enabled at its OE terminal from line 414 leading, in turn, to the write, WR terminal of microprocessor 380. The higher level address terminals, A8-A12 of PROM 412 are coupled by bus 416 to the corresponding address terminals of microprocessor 380, while the lower order address terminals A0-A7 are coupled by bus 418 to the respective terminals 1Q-8Q of an address latch or buffer 420. Latch 420 may, for example, be a type 74HC373 and is shown having its data terminals, 1D-8D, coupled to bus 410 leading to microprocessor 380 via bus 410. The G (enable) terminal of latch 420 is coupled via line 422 to the read, RD terminal of microprocessor 380. Latch 420 is required for the instant circuit inasmuch as microprocessor 380 has a multiplexed address and data bus 402 and address information must be retained or captured.

Bus 410 extends additionally to the Y terminal inputs of a buffer 424, the opposite or A terminal inputs to which are coupled through lead array 426 to the individual switches of a dip switch array 428. Note that each of the leads within array 426 is coupled with a corresponding pull-up resistor of resistor array 430, all such resistors being connected with +5 v supply. The individual switches within switch array 428 provided for operator selection of a variety of operational aspects, for example, the rate of transmission of coordinate pair signals per second. In this regard, the coordinate pair signals may be transmitted at one pair per second, five pairs per second, 40 pairs per second and so on. The user also may set mode switches, electing for example, the mode "point" wherein coordinate pair information or signals are sent when the operator presses a selected button of switch array 142. Further, a "stream" mode may be elected wherein coordinate pair signals are continuously sent, notwithstanding the depression of a switch at array 142. A "switch stream" mode may be elected where the coordinate pair information is sent as a stream of coordinate signals when the button or switch within array 142 is depressed, such transmission being halted when the switch is released; and an "idle" mode may be elected wherein no coordinate pairs are transmitted. The switch 428 also may be set to elect English or metric calibration. Further, the switch permits the operator to elect the positioning of a carriage return or carriage return-line feed character as a suffix to any transmission, while a $\overline{\text{BIN}}$/BCD switch election provides for the submittal of data as binary or as converted to ASCII format.

A similar switch is shown in FIG. 11C at 432. Looking to that switch, the operator may select a baud rate by manipulation of the four switches so labelled. Next in sequence, the operator may elect to provide for parallel data at the following or leading edge of a strobe input by manipulation of the "data strobe" switch. Next in the sequence, the operator may elect to carry out a status valid check. In the next adjacent switch component, an even or odd parity may be selected by the operator, while the next switch in the sequence provides for operator election for parity or no parity. Finally, the switch 432 permits the election of a resolution of either a 3 mil or a 5 mil circle of confusion. The latter three switch inputs at switch 432 are directed to the respective 2A4, 2A3 and 2A1 input ports of a buffer 434. Similar to buffer 424, buffer 434 may be of a type 74HC244 and its output terminals are shown coupled to common data-/address bus 402. The 1A4-1A4 ports of buffer 434 also are coupled with input lines 436-439 extending from the corresponding four switches of the array thereof 142 of tracer 130 (FIG. 7). Note that all inputs to the buffer 434 are coupled through pull-up resistors within the array 440 each, in turn, extending to +5 v supply.

Bus 402 also is shown extending to the output ports of an input buffer 442 which may, for example, be present as a type 74LS244. The input ports to buffer 442 are coupled with a line array 444 each line of which is coupled to +5 v supply through a pull-up resistor of an array thereof shown at 446. Line array 444 serves to provide a parallel connection with a host computer or the like and functions to receive structuring or programming data, for example, corresponding with and overriding the data which the user might otherwise provide through manipulation of earlier-described switches 424 and 432. The parallel output ports of the circuit are shown as line array 448 which extend from connection with the 1Q-8Q output ports of an output latch 450. Present, for example, as a type 74LS273, the 1D-8D input ports of latch 450 are coupled to bus 402 and, as is apparent, the latch provides for 8-bit output data to the host computer with which the apparatus 28 performs. Immediately above latch 450 is another output latch 452 the 1D-8D input ports to which are coupled with bus 402 and the various outputs to which provide for control functions within the system. Provided, for example, as a type 74HC273, the 1Q terminal of latch 452 serves to convey an X CONTROL signal as described in conjunction with line 73 in FIG. 8B and which is represented by the same connector designation 196 as shown in that figure. The 2Q terminal of latch 452 carries the Y CONTROL signal as represented in FIG. 8B at connector 198 and line 74, the former also being reproduced in the instant figure. The 3Q terminal conveys the earlier-described PLUS CONTROL discussed in conjunction with connector 192 in FIG. 8A which connector identification again is reproduced in the instant figure, while the 4Q terminal carries the corresponding MINUS CONTROL as described in the same figure at connector 190, which connector designation is repeated herein. Finally, the 6Q-8Q terminals of latch 452 carry the gain control inputs to automatic gain control circuit 242 as represented in FIG. 9B at connector 248, which connector designation is repeated in the instant figure.

Returning to FIG. 11B, microprocessor 380 is shown to provide the start convert signal at connector 308 as described in conjunction with FIG. 9C through its serial data out terminal (SOD). In similar fashion, the microprocessor receives the conversion complete signal at its serial datainput (SID) terminal from connector 336 emanating from converter 292 as shown in FIG. 9C. The same connector designations are represented in the instant figure. An interrupt to the microprocessor 380 is provided at its RST 6.5 terminal from the timing function of circuit 400 through line 454 and type 74LS86 gate 456. The opposite input to this exclusive OR gate is provided from +5 v supply. In similar fashion, an interrupt is directed to the microprocessor 380 RST 7.5 port from UART 404 to indicate the reception of a byte. In this regard, note that the receiver ready terminal RX is coupled through line 458 and type 748C32 OR gate 460 to the noted terminal. The opposite input to gate 460 is derived from line 462 which, in turn, is coupled to the output of another 74LS86 OR gate 464, the input to which is developed from the uppermost lead of parallel input port lead array 444. Note that the signal carried by the noted lead is ANDed with +5 v supply and is additionally directed to the 1A1 input of buffer 442. In similar fashion, the host reset signal input is shown in FIG. 11C as being directed through line 466 carrying +5 v supply and line 468 carrying inverter 470 to the TRAP terminal input of microprocessor 380.

Component control or system mapping developed from the microprocessor 380 is provided from terminals A13-A15 which are coupled through pull-up resistor array 472 to +5 v and are coupled to the CS1, 1A, 1B, 2A, 2B control input terminals of a decoder 474. Decoder 474 is provided as a type 74HC139, the 1Y0 terminal thereof 474 serves to provide a chip select input along line 476 to the CE terminal of PROM 412 (FIG. 11A). Similarly, the 1Y1 terminal of decoder 474 provides a chip select signal along line 478 to the chip select, CS, terminal of circuit 400. The 1Y2 terminal of decoder 474 is coupled via line 480 to the chip select, CS, terminal of UART 404.

The CS2 terminal of decoder 474 is coupled to the output of an OR gate 482, one input to which at line 484 stems from the output of an inverter 486, the input to which is provided from lines 488 and 490 which are connected to the A15 terminal of microprocessor 380. The opposite input to gate 482 is provided from line 492 which extends to the read, RD, terminal of microprocessor 380.

Terminal 1Y0 of the second grouping of terminals of decoder 474 is shown coupled by line 494 to the enabling input terminals of buffer 442 (FIG. 11C), while the next adjacent output terminal 1Y1 is coupled via line 496 to the corresponding enabling terminals of buffer 434. In similar fashion, the 1Y2 terminal of this second grouping is coupled to provide enablement via line 498 to the corresponding enabling input terminals of buffer 424 (FIG. 11A).

To provide additional decoding capability for the system, terminal 1Y3 of the upper terminal grouping of decoder 474 is coupled by line 500 to one input of OR gate 502. Gate 502 may, for example, be provided as a type 74HC32. The opposite input to gate 502 is derived from the write, WR, terminal of microprocessor 380 by coupling through lines 504 and 506. The output of gate 502 at line 508 is coupled to the clock, CLK, input of output latch 452 (FIG. 11C).

In similar fashion, line 506 is coupled to the input of another OR gate 510, the opposite input to which is provided from line 512 extending from line 484. The output of gate 510 at line 514 extends to the clock, CLK, input of output latch 450. The clear, CLR, terminal of latch 450 additionally is coupled by line 516 to the commonly coupled RST terminals of microprocessor 380, circuit 400 and UART 404 from line 518. The signal from line 518 is inverted at inverter 520 prior to assertion thereof at line 516.

Microprocessor 380 carries out initialization functions upon the application of power to the system or by operator actuation of a switch 520 shown in FIG. 11A. One side of switch 520 is coupled to ground, while the opposite side thereof is connected to line 522 which extends to the RIN terminal of microprocessor 380. Line 522 is held at +5 v supply through resistor 524 which performs within an R-C network in association with a capacitor 526. Accordingly, with the closure of switch 520, capacitor 526 is permitted to discharge to provide for the application of a pulse along line 522. A diode 528 serves to provide protection against voltage transients above +5 v. Power-up restart also is provided automatically in conjunction with the resistor 524-capacitor 526 network. As is apparent, the network provides a desired slight delay.

UART 404 is utilized for serial communication with a given host computer in conjunction with a serial interface port shown in FIG. 11B in general at 118. The input to UART 404 is from microprocessor 380 to the D0–D7 data input ports thereof from bus 402, while the output of the device is provided at the transmit data, TXD port at line 530, which output is buffered at gate 532 for presentation at line 534. A corresponding serial input to UART 404 is provided at line 536 containing an inverter 538 and leading to the RXD terminal. Below these terminals are the conventional handshake functions. In this regard, the ready to send signal provided at the RTS terminal is provided at line 540 incorporating a buffer 542, while the clear to send signal is inputted at the CTS terminal from line 544 which is coupled to +12 v supply through resistor 546. Line 544 also incorporates an inverter 548. The data terminal ready output signal is provided at the DTR terminal of UART 404 and is conveyed via line 550 incorporating buffer 552.

As indicated earlier herein, the baud rate elected for operation of UART 404 is selected by the operator in conjunction with the actuation of components of switch array 432 (FIG. 11C). This election of baud rate is applied via four lead array 556 to the A–D inputs of a baud rate timer 558. The thus-elected frequency output from timer 558 is provided line 560 which is directed to the TXC and RXC terminals of UART 404.

The parallel output port 120 (FIG. 11C) of the digitizer 28, for application with certain host components, requires a select timing input. This select timing input is provided as a data strobe signal at line 562 as shown in FIG. 11C. Line 562 extends from the output of an exclusive OR gate 564, one input to which is an enabling logic level from line 566 extending from an operator controlled data strobe election at switch 432. Note that line 566 is normally held at +5 v supply through resistor 568. The opposite input to gate 564 at line 570 carries the data strobe timing signal from a combined counter 572 and inputting JK flip-flop 574 as shown in FIG. 11B. The J terminal input of flip-flop 574 is coupled to receive the timing output normally applied to output latch 450 by virtue of its connection to line 514 through lines 575 and 576. The clock signal is inverted at line 576 by an inverter 578. A clock input for flip-flop 574 is derived from counter 386 and lines 390 and 392 (FIG. 11A) and carries the noted 204.8 KHz signal. This same signal is applied through inverter 580 and line 582 to the input to counter 572, while the output thereof at line 570 is fed back via line 584 to the K terminal input of flip-flop 574. The output therefor at line 584, representing a division by four provides for the resetting or initializing of flip-flop 574. The output at 570 additionally provides a predetermined delay of about 60 microseconds to represent the noted data strobe signal to the host equipment. Thus, the latch 450 is loaded with data, following which the signal at line 562 indicates that data is available for utilization.

Where the digitizer is receiving data from the host, a data ready signal may be provided from that host, for example, at line 586 of array 444 (FIG. 11C). Line 586 extends to the J terminal input of another flip-flop 588 shown in FIG. 11B. Flip-flop 588 is clocked from line 590 extending to connection with line 384 carrying the clock output of microprocessor 380. The K terminal of the flip-flop is coupled to ground, and the Q terminal output thereof is coupled via line 592 to the 2A3 terminal input of parallel input buffer 442. The clear terminal of flip-flop 588 is coupled to line 575 such that clearing occurs in conjunction with a write command. Flip-flop 588 serves the function of holding the data ready signal received from the host computer until such time as the microprocessor 380 is capable of polling or reading the signal.

Figure 12A:
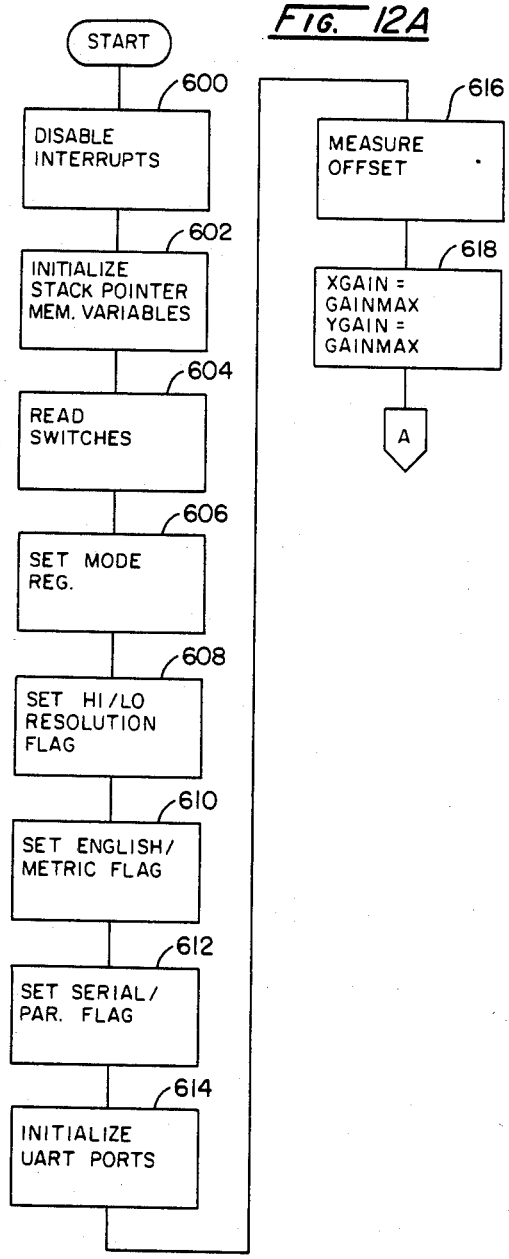
Figures 12C, 12E:
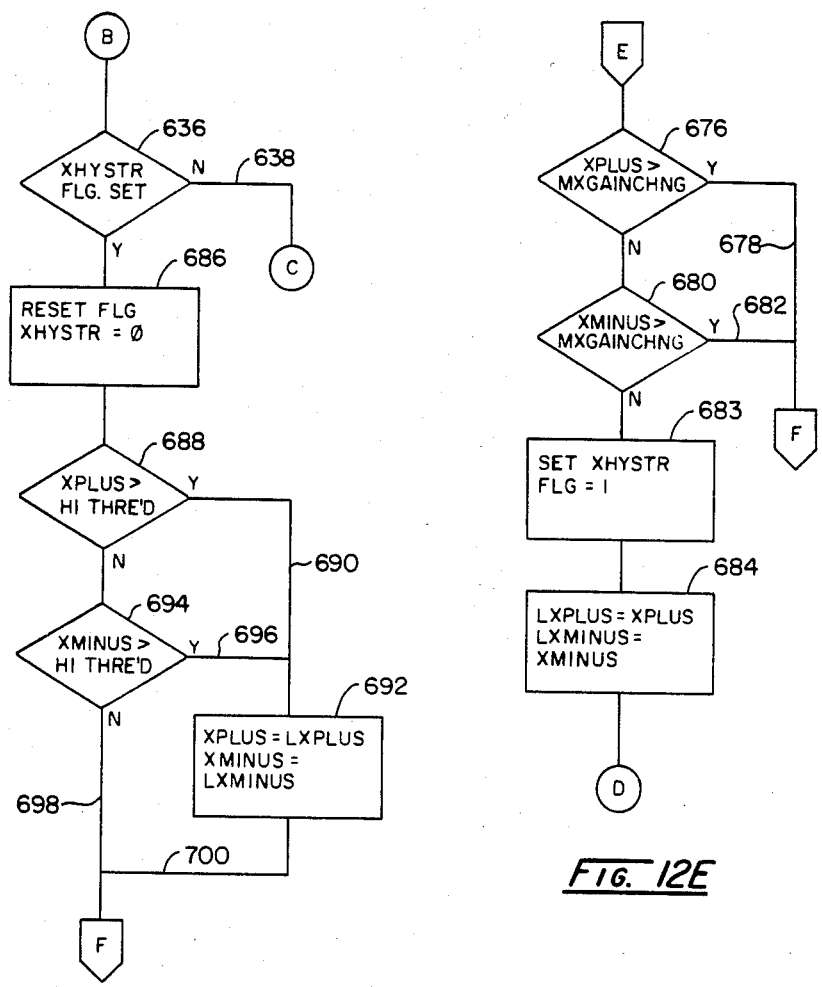

Referring to FIGS. 12A–12C, the overall control program provided for by microprocessor 380 is revealed in diagrammatic fashion. As indicated at the top of FIG. 12A, the program commences upon a start procedure. This procedure, as discussed earlier herein, can be commenced by power up. Additionally, restart can be carried out by the momentary actuation of switch 520 to effect the discharge of capacitor 526. Following start-up, as represented at block 600 of FIG. 12A, all interrupts within the system are disabled such that no interrupt procedure can be carried out during the initialization of the control system. Following this disabling task, the program progresses to initialize stack pointers and memory variables as represented at block 602. Following this task, as represented at block 604, the switches 428 (FIG. 11A) and 432 (FIG. 11C) are read to provide the operator selected parameters for performance of the system. It may be recalled from the discourse in conjunction with FIGS. 11A–11C that the host computer can override the switch selections. Based upon the selection of switches as represented at block 604, the system then sets the mode registers as represented at block 606. There are four possible modes of operation of the system which have been described above as being "point", "stream", "switch stream", and "idle". Following the setting of the mode register, as represented at block 608, the resolution flag is set for high or low resolution as elected by the switches and, as represented at block 610, the English or metric flag is set depending upon operator election at those switches. The program then progresses to the instruction of block 612 wherein a flag is set in accordance with the election of serial or parallel transmission at the noted switches. Finally, as represented at block 614, the ports of UART 404 are initialized.

Because the direct current amplification or similar components of the circuit of the digitizer 28 will exhibit drift characteristics in conjunction with any given operational environment, as described in conjunction with FIG. 9B, a positive offset is assured and that offset then is digitized or measured. This is carried out by essentially bringing line 250 to ground level by microprocessor command to selector network 242. This command is represented at block 616, the amount of offset being measured and retained. Following the measurement of offset, represented at block 618, the microprocessor sets the gain at network 244 and associated control 242 to a maximum value in anticipation for a worst case situation where such gain is required. The program then continues as represented by node or connector A to the instruction shown in FIG. 12B. Looking to that figure, the connector A is shown leading to the instructions of block 620 whereupon the completion of initialization procedures is seen to be followed by an instruction to enable the interrupts for normal operation.

The system then commences to carry out measurements along the x coordinate directions and the system gain is set to the x gain setting as represented by the instruction at block 622. This instruction will set a maximum value for the first cycle of the program, however, as the program continues to cycle, the XGAIN selection will be adjusted. Upon setting the gain, as represented by the instruction block 624, the analog switches are set for an X+ configuration. In this regard, it may be recalled that in FIG. 4, the XCONTROL and PLUSCONTROL signals are actuated such that switches 56 and 67 are set or closed in addition to the switches of arrays 42 and 44. With the provision of this switch logic, as represented by the instruction in block 626, a subroutine ADREAD is called so that a digital valuation is developed corresponding with the XPLUS measurement taken. The program then progresses to the instructions at block 628 where the XPLUS measurements in digital format are stored. As represented at block 630, the system then converts to a minus control while maintaining an XCONTROL setting of the switches so that the opposite direction of the X coordinate may be evaluated. As described at block 632, the ADREAD subroutine is called and digital valuation for XMINUS is developed and, as represented at block 634, this value is stored, all such storage being effected in RAM in conventional fashion.

As represented by node B, the program then progresses to the corresponding node identification in FIG. 12C and the inquiry represented at block 636 determining whether or not the X hysteresis flag has been set. This flag will have been set at such time as a possibility exists that two valid but different gain control evaluations are present for a given XPLUS and XMINUS coordinate evaluation. In the event that the flag is not set, then as represented by line 638 and node C, the program diverts to the instructions shown in FIG. 12D commencing with the connecting node C shown thereon.

In general, the program represented in FIG. 12D determines whether the two X coordinate readings made above are valid in terms of gain. In this regard, a window is established having high and low threshold values within which the digitalized measurements taken are compared. Generally, the criteria for this comparison are that both readings must be below the high threshold of the window and one of them must be above the low threshold. Looking to the inquiry at block 640, a determination is made as to whether the XPLUS value is greater than the high threshold, and in the event that it is, then as represented by line 642, an inquiry is made as represented at block 644 as to whether the XGAIN value is greater than the minimum gain of the system. In the event that it is, then as represented by block 646, the XGAIN value is decreased by one increment as represented by one resistor within the network 244 shown in FIG. 9B. It should be noted, that the resistance values for each of the discrete resistors within network 244 are selected for establishing about 18% increments of impedance. This percentage increment is considered the optimal for carrying out gain alteration without causing an oscillation between adjacent gain values which would otherwise occur with lower percentage incremental values of resistance. Following the adjustment of XGAIN, as represented at node or connector D, the program returns to set the system gain as at block 622 as represented by the corresponding node in FIG. 12B and line 648. In the event the inquiry at block 644 is in the negative, then, as represented by line 650, the program again returns to set the system gain as represented at block 622.

Where the inquiry at block 640 shows that the XPLUS value is higher than the high threshold, then as represented by block 652, a determination is made as to whether the XMINUS value is greater than the high threshold. In the event that it is, then as represented by line 654, the same procedure is carried out for selectively decreasing the XGAIN value. In the event that both the XPLUS and XMINUS values of measurement are below the high threshold value, then as represented at block 656, a determination is made as to whether the XPLUS value is above the low threshold level. In the event that this value is not above that threshold, then as represented by line 658 and block 660, a determination is whether the XMINUS measurement is above the low threshold. In the event that it is, then as represented by line 662 and block 664, the XGAIN value is stored. Similarly, where the inquiry at block 656 indicates that the XPLUS value is above low threshold, as represented by line 666, the XGAIN is stored. This value of XGAIN then is utilized as set forth in conjunction with block 622 in FIG. 12B at such time as the next operational cycle occurs. The program then proceeds to carry out a hysteresis check as represented by connector E.

In the event that neither the XMINUS nor XPLUS values exceed the low threshold, then as represented by line 668 and decision block 670, a determination is made as to whether the XGAIN is less than the maximum available gain of the system. In the event this test is met, as represented at block 672, the XGAIN value is incremented. Conversely, where the XGAIN value is not less than the maximum available gain, then as represented by line 674 and node or connector D, the program returns to the corresponding node at line 648 in FIG. 12B and will be seen to assert the same gain value at line 648. Conversely, where an increase in the XGAIN value has been carried out by the instructions at block 672, then that increased value is asserted at the position represented by line 648 and the gain of the system will reflect that value as represented at block 622.

As indicated earlier herein in conjunction with block 636 of FIG. 12C, where a singular point is evaluated along a given singular coordinate direction by applying the a.c. source first to one border and then the other, it has been found that non-linearities in the resistive surface 30 or in the system itself will cause improper readings for a given coordinate point inasmuch as two different gain levels may be developed for measurement of the same point. Accordingly, the routines represented in FIGS. 12C and 12E are applied. With the routines represented thereby, the highest available valid gain is elected for the system where two valid gains are present. Looking to FIG. 12E, the connector or node E extending from a stored XGAIN instruction at block 664 first is evaluated to determine that if the gain signal were to be increased one gain step or, for example an 18% factor, would the resultant increase remain within the window of threshold acceptance. Accordingly, at block 676 the XPLUS signal is evaluated on the basis that if it were to be increased with respect to an increase in gain of, for example, 1/18th percent or one step, would that value remain within the high threshold value of the window of evaluation. Block 676 carries that evaluation out and in the event that the XPLUS value could be incremented by one gain factor, then as represented at line 678 and connector F, the program may continue. Where the XPLUS signal cannot be so altered, then as represented by block 680, the same evaluation is made of the XMINUS signal. Where the XMINUS signal can be incremented by one gain factor, then as represented by line 682, the program continues without gain alteration.

On the other hand, where both the XPLUS and XMINUS signals fail the evaluations of block 676 and 680, then a condition exists wherein the measurements are not greater than the maximum window threshold. Accordingly, as represented at block 683, the X hysteresis flag is set as discussed in conjunction with block 636 and FIG. 12C. At this point, a prediction is present that a dual gain situation is in effect for a given coordinate point. However, to accommodate for a situation where this prediction is incorrect, the last XPLUS and last XMINUS values initially measured are stored as represented by the instruction of block 684.

Returning to FIG. 12B, it may be observed that node D extends to line 648 and the program continues to node B. As before, this node leads to the corresponding node in FIG. 12C. Referring to FIG. 12C, it may be observed that the inquiry at block 636 is now in the affirmative representing a prediction that there exists a higher gain in the system which will give a valid reading with respect to the high and low threshold defined gain window. Accordingly, the program then proceeds to the instructions in block 686 where the X hysteresis flag is reset to 0 and, as represented at decision block 688, an initial determination is made as to whether the gain change is valid. Accordingly, if the incremented XPLUS value is greater than the high threshold, as represented at line 690 and block 692, the last XPLUS value is reinstated in the program, the prediction having failed. Similarly, where the XPLUS value is not below the high threshold, then as represented at block 694, the same evaluation is made of the incremented XMINUS value. Where the XMINUS value exceeds the high threshold, then as represented by line 696, the last values are utilized as represented at block 692. In the event of a negative determination at block 694, or in the event that last values are utilized, then as represented by lines 698 and 700, the program continues as represented at node or connector F which again is represented at FIG. 12F. Referring to the latter figure, it may be observed that the XPLUS measurement initially is treated by the instruction of block 702 where that value is placed in temporary register to avoid its loss. The program then progresses to average the present XPLUS reading with the last XPLUS reading to effect form of software filtering wherein any transients or rough changes in the system are smoothed out. This instruction is represented at block 704. Then the last XPLUS reading is placed in temporary register to become the present reading as represented by the instruction at block 706. This same procedure then is repeated with respect to the XMINUS measurement, the XMINUS value being placed in temporary register to avoid its loss as represented at block 708, whereupon the XMINUS value is averaged with the last reading as represented at block 710 and the last reading then is placed in temporary register for instant use as represented at block 712.

With this final treatment of the X coordinate measurements, the program then shifts to carry out a corresponding set of coordinate measurements along the Y coordinate direction. Referring to FIG. 12G, it may be observed that node G provides for continuation of the program in conjunction with the instructions of block 714 wherein the YGAIN is recalled from memory and the system gain is set to the value of YGAIN. Next, as represented at block 716 the analog switches are set for a configuration wherein the a.c. source 50 is applied to the plus border of the Y coordinates. In this regard, and referring additionally to FIG. 4, switches 56 and 67 will be closed, while the YCONTROL will be applied to switch arrays 46 and 48. Following the setting of the switches, as represented at block 718, the subroutine ADREAD is called to convert the received signals to digital format. Following this conversion, as represented at block 720, the YPLUS digitized results are stored and the switch system then is set to apply the a.c. source to the negative designated Y coordinate border as represented at block 722. In this regard, the MINUS CONTROL signal is applied to close switches 57 and 64 as shown in FIG. 4. Following the collection of readings, as represented at block 724, the ADREAD subroutine is called to digitize the resultant values and, as represented at block 726, the results are stored as the YMINUS reading. The program then continues as represented at node H which reappears at FIG. 12H. Looking to FIG. 12H, the node H is shown to lead to the decision posed at block 728 wherein a determination is made as to whether the Y hysteresis flag has been set. In the event it has not been set, then as represented at line 730, the program continues as represented at node I which reappears at FIG. 12I. Looking to FIG. 12I, the program initially looks to the high threshold and inquires as to whether the measured YPLUS value is greater than threshold as represented at block 731. The program proceeds as represented by line 732 to the inquiry posed at block 734. At block 734, a determination as to whether the YGAIN is greater than the minimum gain is made and in the event that it is, as represented at block 736, the YGAIN is decreased by one increment or a factor of, for example, 18%. As represented at line 738, the program then proceeds as represented at node J which is shown in FIG. 12G to extend via line 740 to the input to the instructions at block 714 where system gain is set to YGAIN. In the event that the determination at block 734 shows that YGAIN does not exceed the minimum gain, then as represented at line 742, the program again reverts to node J and line 740 as shown in FIG. 12G.

Returning to FIG. 12I, in the event the inquiry at block 731 shows that the YPLUS reading is not greater than the high threshold of the gain entrance window, then as represented at block 744, the corresponding inquiry is made as to whether the YMINUS measurement is above the high threshold of the gain window. In the event that it is, then as represented at line 746, the YGAIN is decreased and the program continues as discussed in conjunction with node J. Where the inquiry at block 744 shows that both measurements are below high threshold, then as represented at block 748, determination is made as to whether the YPLUS measurement is greater than the low threshold of the gain window. In the event that this is not the case, then as represented by line 750 and block 752, the corresponding measurement is made with respect to the YMINUS value. Where the result of the inquiry at block 748 is in the affirmative or the result is affirmative from block 752, then as represented by respective lines 754 and 756, the resultant valid gain is stored as represented at block 758. The program then proceeds as represented at connector K.

Where the inquiry at block 752 determines that YMINUS is not above the low threshold, then as represented at block 760, a determination is made as to whether YGAIN is less than the maximum gain factor available. If this is the case then as represented at block 762 the YGAIN is increased by one factor, for example 18%. In the event the inquiry at block 760 results in a negative response, then as represented by line 764, the program returns via node J and line 740 to a setting of the system YGAIN as shown in FIG. 12G. This same procedure is carried out upon the increasing of the YGAIN as represented at block 762.

Where the YGAIN has been stored as represented at block 758, the program progresses as shown at connector K which is reproduced in FIG. 12J. Referring to the latter figure, the YPLUS value as incremented by one factor of gain is compared with the maximum available gain change as described in conjunction with block 676 for the X coordinate. Where the inquiry results in an affirmative response, no incrementation would be available and, as represented at line 768, the program proceeds to connector L. Where the inquiry at block 766 results in a negative answer, then as represented at block 770, the same inquiry is made of the YMINUS value and, in the presence of an affirmative response, as shown at line 772, the same progression of the program as represented by connector L occurs. Where the inquiry at block 770 results in a negative answer, then as represented at block 774, the Y hysteresis flag is set to one following which, as represented at block 776, a storage function occurs wherein the last value of YPLUS is made YPLUS and the corresponding last value YMINUS is made YMINUS. The program then returns as shown at node J to line 740 as shown in FIG. 12G. As the program repeats, it again encounters the inquiry at block 728 as shown in FIG. 12H. In this case, the inquiry will indicate that the Y hysteresis flag is set and the program will continue to the instruction at block 778 where the hysteresis flag is reset to 0. Upon resetting the hysteresis flag, as shown at block 780, a determination is made as to whether enhanced YPLUS is greater than the high threshold level of the gain window as represented at block 780. In the event that it is, then as represented at line 782 and block 784, the YPLUS value and the YMINUS value are returned to the last values thereof. The program then progresses as shown at line 786 to continue as represented at connector M. Where the determination at block 780 shows that the YPLUS value is below the high threshold level, then as shown at block 788, a corresponding determination is made to whether the enhanced YMINUS value is greater than the high threshold level of the gain window. In the event that the value of the threshold is exceeded, then as represented at line 790, the last values for YPLUS and YMINUS are recalled and the program continues. The program similarly continues where the YMINUS value is below the high threshold level as represented at line 792.

As in the case of the X coordinate, the program then carries out a form of software filtering with respect to Y coordinate measurements to smooth out any transients or rough changes in the system. Looking to FIG. 12K and connector M, the program is seen to store the YPLUS value in temporary register as represented at block 794. Upon effecting such storage, as represented at block 796, the YPLUS value is averaged with the last YPLUS reading. Then, as represented at block 798, the last YPLUS value is stored in temporary register and, as represented at block 800, the YMINUS value is placed in temporary register. The next instruction at block 802 provides for the averaging of the YMINUS values, the current YMINUS value being averaged with the last YMINUS value. Then, as represented a block 804, the last YMINUS value is utilized, being stored in temporary register. The program then is at a stage where a full set of measurements for deriving the X and Y coordinates are developed and the program then looks to deriving coordinate information or position from these values. Referring to FIG. 12L, node N again is reproduced and is shown leading to blocks 806 and 808 which serve to prepare the system for making a next reading. In this regard, the instruction at block 806 provides for setting the system gain to XGAIN and block 808 provides for setting the analog switches to carry out an XPLUS configuration reading.

The program then progresses to the instruction at block 810 wherein a normalized X value, XNORM, is derived using the difference/sum procedure. The value is considered normalized due to its derivation from the natural coordinates of the resistive sheet 30. In this regard, the values at this juncture range from a minus value to a positive value. It then is desired to convert the normalized value, XNORM, to a value in a coordinate system running in terms of positive integers, ie. from a 0 value to some other positive value. Because the resistive sheet 30 will have variations in its structure, the actually read value from one border to another will not follow a precise progression. Consequently, the minimum or 0 value of the sheet 30 is pre-read and stored in ROM memory for corrective use. This value is designated XMIN. Similarly, the corresponding measurement is taken with respect to the Y coordinate direction, the value YMIN being developed and placed in memory.

As shown at block 812, the program then subtracts the value XMIN from the value for XNORM and multiplies it by an expansion factor designated X$EXPAND. The latter term simply is an expansion factor to provide a large number suited for digital treatment, for example 64,000.

The program then checks the resultant value for X to assure that no unacceptable number is present. Such a bogus value, for example, might occur where the tracer has been located outside of the active area of sheet 30. Accordingly, as represented at block 814, a determination is made as to whether the X value is greater than the known maximum X value, XMAX. In the event that it is, then as represented by line 816 and connector O, the program starts again, returning to the corresponding connector designation in FIG. 12B wherein a command to carry out an analog-to-digital conversion reading is made as represented at block 626. Note that node O in the latter figure extends to the program via line 818.

Figure 13:
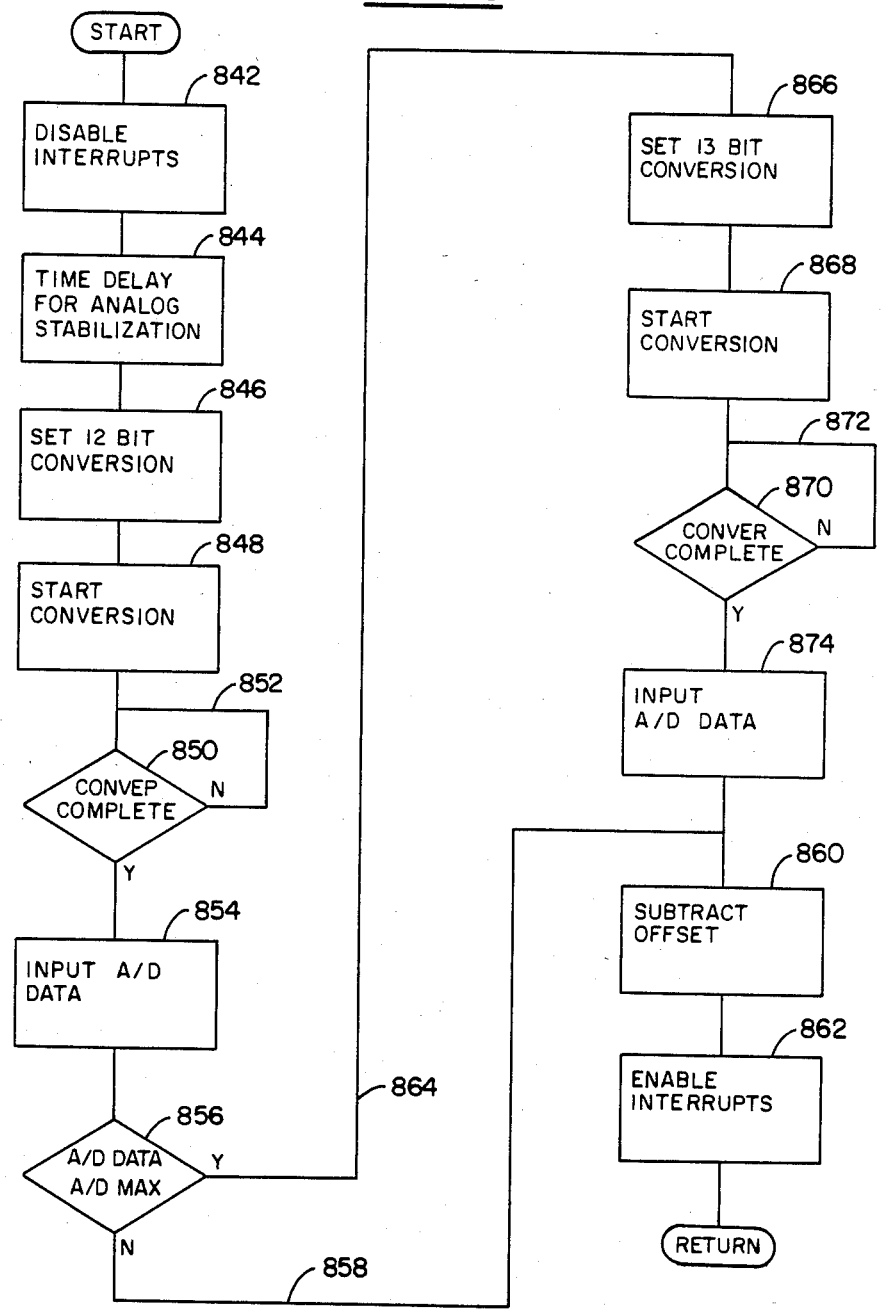
FIG. 13 is a flow chart describing the ADREAD subroutine of the control program of the invention.

In the event the X value is acceptable with respect to a maximum valuation, then the program looks to the comparison made at block 820 wherein the X value is compared with a minimum or 0 evaluation. In the event that the X value is below such 0 evaluation, then as represented by line 822 and 816, the program returns to line 818 as above discussed. Where the X value is correct with respect to 0, then as represented by line 824, the corresponding operations are carried out with respect to Y valuations. In this regard, as shown at block 826, the normalized Y value, YNORM, is derived as a difference/sum ratio, whereupon, as shown at block 828, a corrected and expanded value for Y is developed and, this value is tested in accordance with the instruction at block 830 to determine whether it is beyond the YMAX value. In the event that is the case, as represented at line 832 and connector O, the program returns to line 818 in FIG. 12B. Where the Y value is correct with respect to YMAX, then as represented at block 834, the value of Y is tested with respect to 0. Where it is less than 0, then as represented by lines 836 and 832, the program returns to line 818 as above discussed. Where the Y value is proper with respect to tracer location and the like, then as represented by block 838 an error correction procedure is carried out which is digital in nature and is provided to correct for variations in the thickness of coating of the resistive sheet 30. A subroutine for carrying out this error correction is described in copending application for U.S. Pat. Ser. No. 06/664,980, filed of even date herewith and assigned in common herewith entitled Electrographic System and Method by R. Kable and S. Nakamura. Following error correction, the program calls for an output subroutine described later herein and shown at block 840. This completes the general program, the program returning to line 818 and connector O as described in conjunction with FIG. 12B. It may be recalled that a subroutine referred to as ADREAD was described in conjunction with block 626 in FIG. 12B. This subroutine is described in enhanced detail in conjunction with FIG. 13. Referring to that figure, following an appropriate start or call for the subroutine, the subroutine calls for the disablement of interrupts as shown at block 842. This disablement is carried out inasmuch as software timing is involved and any interrupt activity would create unwanted disturbance. The program then carries out a time delay as represented at block 844 to permit the analog circuits and filtering functions to "settle down" to achieve improved valuation. Such a delay, for example, may be on the order of about 2 milliseconds. Following the delay, as represented at block 846, the conversion bit is set, an initial determination being to carry out 12 bit conversion. Such conversion then is started as represented at block 848 and the program sits in a loop as represented by block 850 and loop line 852 until the conversion is complete. Upon completion of conversion, the data are inputted and as represented at block 856, a test is carried out to determine if the data are below half scale as above discussed. This is shown by comparing the A/D data with the half scale value identified as A/Dmax. In the event the data are below half scale, then as represented by line 858, the earlier-determined offset value is subtracted from data value. Upon completing such subtraction, as represented at block 860, the interrupts again are enabled as represented at block 862 and the subroutine returns to the main program.

In the event the test carried out at block 856 shows that the data level is above half scale, then as represented by line 864 and block 866, the bit 13 signal is generated as represented in FIG. 9C at connector 340 to provide for 13 bit conversion. This conversion then is commenced as represented at block 868 and the program enters into a holding loop as represented by block 870 and loop line 872 until such time as the conversion is completed. Upon completion of conversion, as represented at block 874, the resultant data in digital form are inputted and the subroutine continues, subtracting the offset value as represented at block 860 (see block 616, FIG. 12A) and enabling the interrupts as represented at block 862 whereupon it returns to the main program.

Referring to FIG. 14A, the output subroutine described in connection with block 840 in FIG. 12L is set forth in detail. At the point of entry of this subroutine, the program has developed an X and a Y value which has been corrected as well as scaled with respect to the election of English or metric values and with respect to the earlier-described election of high or low resolution. Further, the values will have been digitized with respect to a scale of 0 to 64,000, representing a valuation of 0 through 1. The initial determination made by the output subroutine is that identifying whether the tracer 130 is in a state of motion or is being held stationary by the operator. In the event it is being held stationary, then, to avoid flicker at a resultant output screen, a form of software filtering is carried out.

To determine whether or not motion is at hand on the part of the tracer 130, the absolute value of the last value of X which was submitted to the host computer, identified as XSEND is subtracted from the instantaneous value of X and that absolute value is compared with a window which is a corresponding value which is elected to determine whether the difference noted above corresponds with the stationary condition. This comparison is represented at block 876. In the event that the absolute value is greater than the window, a moving tracer is indicated and as represented at block 878, the value XSEND is made equal to X and the value X is made ready for transmission to the host.

In the event that the comparison of block 876 indicates that motion is not at hand, then as represented at line 880 and block 882, a weighted averaging procedure is carried out wherein the last value to be sent, ie. XSEND, is given a weight of 3 and the current value of X is given a unity weighting. These weighted values are summed and divided by four to provide a value which will effect a stable readout at a screen or the like. As represented by lines 882 and 884, the subroutine then continues to carry out the same evaluation with respect to the value of Y as represented by the comparison made at block 886. Where that comparison shows that the tracer 130 is moving then as represented by block 888, the value of YSEND is made equal to in readiness for outputting. On the other hand, where the comparison at block 886 indicates that the tracer is not moving, then as represented by line 890 and block 892, the same form of weighted averaging is carried out as described in conjunction with block 882. As represented at blocks 894 and 896, the subroutine then progresses to the instructions at block 898 to read the mode register. This will indicate whether the mode is the earlier-described point, stream, or switch stream. This determination is made by first determining whether the point mode is present as represented by the instruction at block 900. Where the point mode is indicated, then as represented at line 902 and node P, the subroutine determines whether the appropriate switch of array 142 is depressed or active as represented at block 904. It may be recalled that in a point mode only one set of coordinates is transmitted when the switch or button is activated. Where the switch is not active, then the subroutine returns to the main program, the coordinate having been sent. However, where the switch remains active, a determination is made as to whether that same coordinate value or point had been sent before. For such a situation, a cursor flag will have been set to 1. Accordingly, as represented at block 906, a determination is made as to whether the cursor flag is a 0 or 1. Where an indication at the point or value has been sent, then as represented by lines 908 and 910, the subroutine returns to the main program. However, where the cursor flag value is 0, then as represented at block 912, the cursor is set to 1 and as represented at line 914, the subroutine continues as represented by the connector Q. In similar fashion, where the determination at block 904 is that the switch from array 142 is not active or depressed, then as represented by line 910, the subroutine returns to the main program.

Where the inquiry represented at block 900 shows that the point mode is not present, then as represented by block 916, a determination is made as to whether the switch stream mode is present. Where it is not, then as represented by line 918 and connector Q, the subroutine continues. However, where the inquiry at block 916 shows that the switch stream mode has been elected, then a continuing "stream" of coordinates are sent as long as the appropriate switch of array 142 remains depressed or actuated. Accordingly, with an affirmative determination at block 916, as represented at line 920 and lines 922, a determination is made as to whether the switch of array 142 is active or actuated and in the event that it is not, then as represented by line 924, the subroutine returns to the main program. On the other hand, where the determination at block 922 shows that the appropriate tracer switch is active, then as represented by lines 926 and 918, the subroutine continues as represented by connector Q.

Looking to FIG. 14B, the connector Q again is reproduced and the logic of the subroutine at this juncture will indicate that if the mode is not point or switch stream, then it is stream, wherein coordinate values are continuously sent. The next determination made in the subroutine then determines whether English or metric units have been elected by the operator as represented by the query at block 928. Where that query determines that metric units have been elected, then as represented by line 930 and block 932, a next query is made to determine whether high resolution or low resolution has been elected by the operator. Where high resolution has been elected, then as represented by line 934 and block 936, a scale factor specific to metric high resolution is applied and the subroutine continues as represented by line 938. Where the inquiry at block 932 indicates that low resolution has been elected, then a scale factor specific to metric low resolution election is applied as represented by block 940 and the subroutine continues as represented by line 938.

Where the determination is made at block 928 that English units have been elected by the operator, then as represented by block 942, a determination is made as to whether high resolution or low resolution is elected. Where high resolution is elected by the operator, then as represented by line 944 and block 946, a specific scale factor for high resolution in conjunction with English units is applied and the subroutine continues as represented by line 938. Similarly, where the inquiry at block 942 indicates an election of low resolution, then as represented by block 948, a scale factor specific for English units and low resolution is applied. The subroutine continues then to the inquiry at block 950 determining whether the host computer requires a binary input or binary coded decimal input, the latter being represented by ASCII characters. With the election of binary coded decimal outputs, then as represented by line 952 and block 954, the values are converted to ASCII characters and the subroutine continues as represented at line 956. Where the inquiry at block 950 shows that the host computer requires binary input, then the subroutine continues to the inquiry at block 958 wherein the determination is made as to whether the output is to be through the parallel port 120 or the serial port 118. Where the parallel port is elected, then as represented by line 960 and block 962, a command is set forth for sending data to the parallel port 120. On the other hand, where the inquiry at block 958 indicates that serial outputting is desired, then as represented at block 964, the data are sent to the UART 404 and port 118.

The subroutine further continues as represented at line 966 and block 968. The instructions at block 968 function to count the number of accrued output signals and following some large number of these representing a long term interval, for example 65,000 outputs, to cause the carrying out of an additional reading of the offset values of the direct current stages of the system. This assures accommodation for long term drift phenomena or the like. Accordingly, where the nth output has not occurred, then as represented at line 970, the subroutine returns to the main program. On the other hand, where that nth output occurs, then as represented by line 972 and block 974, the offset values are again read and evaluated. The subroutine then returns to the main program as represented by lines 976 and 970.

Since certain changes may be made in the above-described system, method and apparatus without departing from the scope of the invention herein, it is intended that all matter contained in the description thereof or shown in the accompanying drawings shall be interpreted as illustrative and not in a limiting sense.

I claim:

1. Electrographic apparatus comprising:

an insulative substrate;
a resistive layer supported upon said insulative substrate and having an operational area extending in an x-coordinate sense between first and second parallel, spaced-apart border regions, and extending in a y-coordinate sense between third and fourth parallel, spaced-apart border regions;
a plurality of first, discrete, spaced-apart contacts electrically coupled with said resistive layer at said first border region;
a plurality of second, discrete, spaced-apart contacts electrically coupled with said resistive layer at said second border region;
a plurality of third, discrete, spaced-apart contacts electrically coupled with said resistive layer said third border region;
a plurality of fourth, discrete, spaced-apart contacts electrically coupled withh said resistive layer at said fourth border region;
circuit means providing an active electrical circuit function;
a ground reference;
first discrete solid state series switches, each coupled with a select one of said first contacts and actuable to a closed condition in response to a receipt of a first coordinate logic signal;
second discrete solid state series switches, each coupled with a select one of said second contacts and actuable to a closed condition in response to receipt of said first coordinate logic signal;
third discrete solid state series switches, each coupled with a select one of said third contacts and actuable to a closed condition in response to receipt of a second coordinate logic signal;
fourth discrete solid state series switches, each coupled with a select one of said fourth contacts and actuable to a closed condition in response to receipt of said second coordinate logic signal;
a first solid state directional control switch coupled in series between said first discrete solid state series switches, said third discrete solid state series switches and said circuit means and actuable in response to a first directional logic signal to electrically couple said first and third discrete solid state switches with said circuit means;
a second solid state directional control switch coupled in series between said second discrete solid state series switches, said fourth discrete solid state series switches and said ground reference and actuable in response to said first directional logic signal to electrically couple said second and fourth discrete solid state switches with said ground reference;
a third solid state directional control switch coupled in series between said second discrete solid state series switches, said fourth discrete solid state series switches and said circuit means and actuable in response to a second directional logic signal to electrically couple said second and fourth discrete solid state switches with said circuit means;
a fourth solid state directional control switch coupled in series between said first discrete solid state series switches, said third discrete solid state series switches and said ground reference and actuable in response to said second directional logic signal to electrically couple said first and third discrete solid state switches with said ground reference;
control means coupled with said first, second, third and fourth series switches and said first, second, third and fourth directional control switches for simultaneously providing said first coordinate logic signal and said first directional logic signal during a first data mode, for simultaneously providing said first coordinate logic signal and said second directional logic signal during a second data mode, for simultaneously providing said second coordinate logic signal and said first directional logic signal during a third data mode, and for simultaneously providing said second coordinate logic signal and said second directional logic signal during a fourth data mode; and
locator means movable into adjacency with said resistive layer for reacting therewith during said first, second, third and fourth data modes to provide for the development of x-coordinate and y-coordinate signals.

2. The electrographic apparatus of claim 1 in which;
said circuit means includes a time variable source and a signal treatment network; and
said first and third solid state directional control switches are coupled with said source and said locator means is coupled with said signal treatment network.

3. The electrographic apparatus of claim 1 in which:
said circuit means includes a time variable source of predetermined frequency and a signal treatment network; and
said first and third solid state directional control switches are coupled with said signal treatment network and said locator means is coupled with said source.

4. The electrographic apparatus of claim 1 in which said locator means is a tracer comprising:
a body portion having two oppositely disposed upstanding sides configured for being manually grasped substantially between the thumb and forefinger of an operator's hand and having an axis extending generally parallel with said sides;
an electrically conductive annular ring mounted to and forwardly of said body portion for positioning in adjacency with said resistive layer to effect electrical interaction therewith; and
a transparent support mounted with said ring and having crosshairs thereon intersecting the center of said annular ring, the alignment of said crosshairs being canted with respect to said axis by a predetermined angle selected to normally align said crosshairs vertically and horizontally before said operator when said tracer is naturally grasped.

5. The electrographic apparatus of claim 1 in which said tracer crosshair cant is about 30 degrees with respect to said axis.

6. Electrographic apparatus comprising:
an insulative substrate;
a resistive layer supported upon said insulative substrate and having an operational area extending in an x-coordinate sense between first and second parallel, spaced-apart border regions, and extending in a y-coordinate sense between third and fourth parallel, spaced-apart border regions;
a plurality of first, discrete, spaced-apart contacts electrically coupled with said resistive layer at said first border region;

a plurality of second, discrete, spaced-apart contacts electrically coupled with said resistive layer at said second border region;

a plurality of third, discrete, spaced-apart contacts electrically coupled with said resistive layer at said third border region;

a plurality of fourth, discrete, spaced-apart contacts electrically coupled with said resistive layer at said fourth border region;

a time varying excitation source of select frequency;

a ground reference;

first discrete solid-state series switches, each coupled with a select one of said first contacts and actuable to a closed condition in response to receipt of a first coordinate logic signal;

second discrete solid-state series switches, each coupled with a select one of said second contacts and actuable to a closed condition in response to receipt of said first coordinate logic signal;

third discrete solid-state series switches, each coupled with a select one of said third contacts and actuable to a closed condition in response to receipt of a second coordinate logic signal;

fourth discrete solid-state series switches, each coupled with a select one of said fourth contacts and actuable to a closed condition in response to receipt of said second coordinate logic signal;

a first solid-state directional control switch coupled in series between said first discrete solid-state series switches, said third discrete solid-state series switches and said source and actuable in response to a first directional logic signal to electrically couple said first and third discrete solid-state switches with said source;

a second solid-state directional control switch coupled in series between said second discrete solid-state series switches, said fourth discrete solid-state series switches and said ground reference and actuable in response to said first directional logic signal to electrically couple said second and fourth discrete solid-state switches with said ground reference;

a third solid-state directional control switch coupled in series between said second discrete solid-state series switches, said fourth discrete solid-state series switches and said source and actuable in reference to a second directional logic signal to electrically couple said second and fourth discrete solid-state switches with said source;

a fourth solid-state directional control switch coupled in series between said first discrete solid-state series switches, said third discrete solid-state series switches and said ground reference and actuable in response to said second directional logic signal to electrically couple said first and third discrete solid-state switches with said ground reference;

locator means movable about said resistive layer in adjacency therewith for effecting capacitive coupling therewith at positions with respect thereto to provide position signals developed therefrom and having a given response characteristic;

signal treatment means including an input stage responsive to said position signals for effecting the amplification thereof to provide amplified position signals;

filter means for filtering said amplified position signals in correspondence with said select frequency to provide filtered position signals;

gain control means responsive to a gain control input to impose an amplitude attenuation of said filtered position signals selected from a range of impedance derived increments of attenuation values to provide gain controlled position signals;

converter means responsive to said gain controlled position signals to provide d.c. level position signals corresponding therewith;

digital converter means responsive, when actuated, to convert said d.c. level position signals to digital position signals; and control means coupled with said first, second, third and fourth series switches and said first, second, third and fourth directional control switches for simultaneously providing said first coordinate logic signal and said first directional logic signal during a first data mode, for simultaneously providing said first coordinate logic signal and said second directional logic signal during a second data mode, for simultaneously providing said second coordinate logic signal and said first directional logic signal during a third data mode, and for simultaneously providing said second coordinate logic signal and said second directional logic signal during a fourth data mode, said control means being responsive to cyclically compare the value of said digital position signals with respect to the predetermined threshold values of an acceptance range of value to derive said gain control input and for providing digital data signals corresponding with said digital position signals.

7. The electrographic apparatus of claim 6 in which said control means is responsive to a condition wherein two said digital position signals corresponding with a single said locator means position occur simultaneously having values effecting the derivation of different said increments of attenuation, and is further responsive to generate a said gain control input representing only one elected said increment of attenuation.

8. The electrographic apparatus of claim 6 in which:
said signal treatment means includes offset network means for asserting a positive offset signal with said d.c. level position signals; and
said control means is responsive to measure the value of said d.c. level position signals in the absence of said gain controlled position signals to derive an offset value and to subtract said offset value from said digital position signals.

9. The electrographic apparatus of claim 6 in which:
said locator means includes connector means for identifying said response characteristic; and
said signal treatment means includes attenuation means responsive to said connector means for selectively attenuating said amplified position signals in correspondence with said response characteristic.

10. The electrographic apparatus of claim 6 in which said control means includes:
memory means for retaining border data values representing said digital position signals corresponding with the terminus of said operational area of said resistive layer at each said first, second, third and fourth border regions; and
said control means is responsive to compare each said digital data signal with a corresponding said border data value to determine when said composed digital data signal represents a said locator means position without said operational area and to negate the said provision of said digital data signals upon said determination.

11. The electrographic apparatus of claim 6 in which said control means is responsive to effect a comparison of the values of the difference of two successive said digital data signals with a predetermined reference value to determine a state of movement of said locator means; and is responsive in the absence of said state of movement to average successively derived said digital data signals and subsequently output them, so as to avoid jitter effects at a readout thereof.

12. The electrographic apparatus of claim 6 in which:
said locator means includes signal means for providing a perceptible output when actuated; and
said control means is responsive to the outputting of said digital data signals representing coordinate pair data to effect attenuation of said signal means.

13. The electrographic apparatus of claim 6 in which:
said signal treatment means includes offset network means for asserting a positive offset signal with said d.c. level position signals; and
said control means is responsive to measure the value of said d.c. level position signals in the absence of said gain controlled position signals to derive an offset value and to subtract said offset value from said digital position signals;
said control means further being responsive to a condition wherein
two said digital position signals corresponding with a single said locator means position occur simultaneously having values effecting the derivation of different said increments of attenuation, and is further responsive to generate a said gain control input representing only one elected said increment of attenuation.

14. The electrographic apparatus of claim 13 in which said control means includes:
memory means for returning border data values representing said digital position signals corresponding with the terminus of said operational area of said resistive layer at each said first, second, third and fourth border regions; and
said control means is responsive to compare each said digital data signal with a corresponding said border data value to determine when said composed digital data signal represents a said locator means position without said operational area and to negate the said provision of said digital data signals upon said determination.

15. The electrographic apparatus of claim 13 in which said control means is responsive to effect a comparison of the values of the difference of two successive said digital data signals with a predetermined reference value to determine a state of movement of said locator means; and is responsive in the absence of said state of movement to average successively derived said digital data signals and subsequently output them, so as to avoid jitter effects at a readout thereof.

16. The electrographic apparatus of claim 6 in which:
said control means is responsive to a condition wherein two said digital position signals corresponding with a single said locator means position occur simultaneously having values effecting the derivation of different said increments of attenuation, and is further responsive to generate a said gain control input representing only one elected said increment of attenuation;
said locator means includes connector means for identifying said response characteristic; and
said signal treatment means includes attenuation means responsive to said connector means for selectively attenuating said amplified position signals in correspondence with said response characteristic.

17. The electrographic apparatus of claim 16 in which:
said control means is responsive to effect a comparison of the values of the difference of two successive said digital data signals with a predetermined reference value to determine a state of movement of said locator means; and is responsive in the absence of said state of movement to average successively derived said digital data signals and subsequently output them, so as to avoid jitter effects at a readout thereof.

18. The electrographic apparatus of claim 16 in which:
said locator means includes signal means for providing a perceptible output when actuated; and
said control means is responsive to the outputting of said digital data signals representing coordinate pair data to effect attenuation of said signal means.

19. The electrographic apparatus of claim 6 in which said control means includes:
memory means for retaining border data minimum values representing said digital position signals corresponding with the terminus of said operational area of said resistive layer at each said first, second, third and fourth border regions; and
said control means effects the determination of a normalized digital position value operation upon said digital position signals derived during said first and second data modes, and is responsive to subtract the corresponding minimum border data value from said normalized digital position value to derive said digital data signals.

20. Electrographic apparatus comprising:
an insulative substrate;
a resistive layer supported upon said insulative substrate and having an operational area extending in an x-coordinate sense between first and second parallel, spaced-apart border regions, and extending in a y-coordinate sense between third and fourth parallel, spaced-apart border regions;
a plurality of first, discrete, spaced-apart contacts electrically coupled with said resistive layer at said first border region;
a plurality of second, discrete, spaced-apart contacts electrically coupled with said resistive layer at said second border region;
a plurality of third, discrete, spaced-apart contacts electrically coupled with said resistive layer at said third border region;
a plurality of fourth, discrete, spaced-apart contacts electrically coupled with said resistive layer at said fourth border region;
signal treatment means including an input stage for receiving position signals to effect the amplification thereof to derive amplified position signals;
a ground reference;
first discrete solid-state series switches each coupled with a select one of said first contacts and actuable to a closed condition in response to receipt of a first coordinate logic signal;

second discrete solid-state series switches, each coupled with a select one of said second contacts and actuable to a closed condition in response to receipt of said first coordinate logic signal;

third discrete solid-state series switches, each coupled with a select one of said third contacts and actuable to a closed condition in response to receipt of a second coordinate logic signal;

fourth discrete solid-state series switches, each coupled with a select one of said fourth contacts and actuable to a closed condition in response to receipt of said second coordinate logic signals;

a first solid-state directional control switch coupled in series between said first discrete solid-state series switches, said third discrete solid-state series switches and said signal treatment means input stage and actuable in response to a first directional logic signal to electrically couple said first and third discrete solid-state switches with said signal treatment means input stage;

a second solid-state directional control switch coupled in series between said second discrete solid-state series switches, said fourth discrete solid-state series switches and said ground reference and actuable in response to said first directional logic signal to electrically couple said second and fourth discrete solid-state switches with said ground reference;

a third solid-state directional control switch coupled in series between said second discrete solid-state series switches, said fourth discrete solid-state series switches and said signal treatment means input stage and actuable in response to a second directional logic signal to electrically couple said second and fourth discrete solid-state switches with said signal treatment means input stage;

a fourth solid-state directional control switch coupled in series between said first discrete solid-state series switches, said third discrete solid-state series switches and said ground reference and actuable in response to said second directional logic signal to electrically couple said first and third discrete solid-state switches with said ground reference;

a time varying excitation source of select frequency;

locator means coupled with said source and movable into adjacency with said resistive layer for capacitively coupling said source therewith during first, second, third and fourth data modes to provide for the development of said position signals;

filter means for filtering said amplified position signals in correspondence with said select frequency to provide filtered position signals;

gain control means responsive to a gain control input to impose an amplitude attenuation of said filtered position signals selected from a range of impedance derived increments of attenuation values to provide gain controlled position signals;

converter means responsive to said gain controlled position signals to provide d.c. level position signals corresponding therewith;

digital converter means responsive, when actuated, to convert said d.c. level position signals to digital position signals; and control means coupled with said first, second, third and fourth series switches and said first, second, third and fourth directional control switches for simultaneously providing said first coordinate logic signal and said first directional logic signal during said first data mode, for simultaneously providing said first coordinate logic signal and said second directional logic signal during said second data mode, for simultaneously providing said second coordinate logic signal and first directional logic signal during said third data mode, and for simultaneously providing said second coordinate logic signal and said second directional logic signal during said fourth data mode, said control means being responsive to cyclically compare the value of said digital position signals with respect to the predetermined threshold values of an acceptance range of values to provide said gain control input and for providing digital data signals corresponding with said digital position signals.

21. The electrographic apparatus of claim 20 in which said control means is responsive to a condition wherein two said digital position signals corresponding with a single said locator means position occur simultaneously having values effecting the derivation of different said increments of attenuation, and is further responsive to generate a said gain control input representing only one selected said increment of attenuation.

22. The electrographic apparatus of claim 20 in which:

said signal treatment means includes offset network means for asserting a positive offset signal with said d.c. level position signals; and said control means is responsive to measure the value of said d.c. level position signals in the absence of said gain controlled position signals to derive an offset value and to subtract said offset value from said digital position signals.

23. The electrographic apparatus of claim 20 in which said control means includes:

memory means for retaining border data values representing said digital position signals corresponding with the terminus of said operational area of said resistive layer at each said first, second, third and fourth border regions;

said control means is responsive to compare each said digital position signal with a corresponding said border data value to determine when said compared digital position signal represents a said locator means position without said operational area and to negate the said provision of said coordinate pair digital data signals upon said determination.

24. The electrographic apparatus of claim 20 in which said control means is responsive to effect a comparison of the values of the difference of two successive said digital data signals with a predetermined reference value to determine a state of movement of said locator means, and is responsive in the absence of said state of movement to average successively derived said digital data signals and subsequently outputting them, so as to avoid jitter effects at a readout thereof.

25. The electrographic apparatus of claim 20 in which:

said locator means includes signal means for providing a perceptible output when actuated; and said control means is responsive to the outputting of said digital data signals representing coordinate pair data to effect actuation of said signal means.

26. Electrographic apparatus comprising:

means defining a resistive surface of given active area and having oppositely disposed border regions;

a time varying excitation source of select frequency;

a ground reference;

switching means controllable for applying said ground reference to one said border region while simultaneously applying said source to the oppositely disposed said border region during a firt operational mode and for reversing said applications of ground reference and source to said border regions during a second operational mode;

locator means movable in adjacency with and about said resistive surface for effecting capacitive coupling therewith during said first and second modes to provide position signals, said locator means having a given response characteristic;

signal treatment means including an input stage responsive to said position signals for effecting the amplification thereof to provide amplified position signals;

filter means for filtering said amplified position signals in correspondence with said select frequency to provide filtered position signals;

gain control means for imposing an amplitude attenuation of said filtered position signals to provide gain controlled position signals;

converter means responsive to said gain controlled position signals to provide d.c. level position signals corresponding therewith;

digital converter means responsive, when actuated, to convert said d.c. level position signals to digital position signals;

control means for controlling said switching means to provide said first and second operational modes for providing digital data signals corresponding with said digital position signals, and for deriving said gain control input and responsive to effect a comparison of the values of the difference of two successive said digital data signals with a predetermined reference value to determine a state of movement of said locator means, and responsive in the absence of said state of movement to average successively derived said digital data signals and subsequently output them, so as to avoid jitter effects at a readout thereof.

27. The electrographic apparatus of claim 26 in which:
said gain control means is responsive to a gain control input to impose a said amplitude attenuation of said filtered position signals selected from a range of impedance derived increments of attenuation values to provide said gain controlled signals; and
said control means is responsive to cyclically compare the value of said digital position signals with respect to the predetermined threshold values of an acceptance range of values to derive said gain control input and is further responsive to a condition wherein said two digital position signals corresponding with a single said locator means position occur simultaneously having values effecting the derivation of different said increments of attenuation, and is further responsive to generate a said gain control input representing only one elected said increment of attenuation.

28. The electrographic apparatus of claim 26 in which:
said signal treatment means includes offset network means for asserting a positive offset signal with said d.c. level position signals; and
said control means is responsive to measure the value of said d.c. level position signals in the absence of said gain controlled position signals to derive an offset value and to subtract said offset value from said digital position signals.

29. The electrographic apparatus of claim 26 in which:
said locator means includes connector means for identifying said response characteristics; and
said signal treatment means includes attenuation means responsive to said connector means for selectively attenuating said amplified position signals in correspondence with said response characteristic.

30. The electrographic apparatus of claim 26 in which:
said locator means includes signal means for providing a preceptible output when actuated; and
said control means is responsive to the outputting of said digital data signals representing coordinate pair data to effect actuation of said signals means.

31. The electrographic apparatus of claim 26 in which said locator means is a tracer comprising:
a body portion having two oppositely disposed upstanding sides configured for being manually grasped substantially between the thumb and forefinger of an operator's hand and having an axis extending generally parallel with said sides;
an electrically conductive annular ring mounted to and forwardly of said body position for positioning in adjacency with said resistive layer to effect electrical interaction therewith; and
a transparent support mounted with said ring and having crosshairs thereon intersecting the center of said annular ring, the alignment of said crosshairs being canted with respect to said axis by a predetermined angle selected to normally align said crosshairs vertically and horizontally before said operator when said tracer is naturally grasped.

32. The electrographic apparatus of claim 26 in which said tracer crosshair cant is about 30 degrees with respect to said axis.

33. Electrographic apparatus comprising:
means defining a resistive surface of given active area having oppositely disposed border regions;
a time varying excitation source of select frequency;
a ground reference;
switching means controllable for applying said ground reference to one said border region and simultaneously applying said source to the oppositely disposed said border region during a first operational mode, and for reversing said applications of ground reference and source to said border regions during a second operational mode;
locator means movable in adjacency about said resistive surface for effecting capacitive coupling therewith during said first and second modes to provide position signals, said locator means having a given response characteristic;
signal treatment means including an input stage responsive to said position signals for effecting the amplification thereof to provide amplified position signals;
filter means for filtering said amplified position signals in correspondence with said select frequency to provide filtered position signals;
converter means responsive to said filtered position signals to provide d.c. level position signals corresponding therewith;

digital converter means responsive, when actuated, to convert said d.c. level position signals to digital position signals;

control means for controlling said switching means to provide said first and second operational modes, said control means having memory means for retaining border data minimum values representing said digital position signals corresponding with the terminus of said active area of said resistive surface at each said border region thereof, said control means effecting the determination of normalized digital position values with respect to said first and second operational modes as a difference/sum ratio and being responsive to subtract the corresponding minimum border data value from said normalized digital position value to derive a difference value which is expanded to, in turn, derive digital data signals.

34. The electrographic apparatus of claim 33 in which:

said signal treatment means includes offset network means for asserting a positive offset signal with said d.c. level position signals; and said control means is responsive to measure the value of said d.c. level position signals in the absence of said position signals to derive an offset value and to subtract said offset value from said digital position signals.

35. The electrographic apparatus of claim 33 in which said control means is responsive to effect a comparison of the values of the difference of two successive said digital data signals with a predetermined reference value to determine a state of movement of said locator means; and is responsive in the absence of said state of movement to average successively derived said digital data signals and subsequently output them, so as to avoid jitter effects at a readout thereof.

36. The electrographic apparatus of claim 33 in which:

said locator means includes signal means for providing a perceptible output when actuated; and said control means is responsive to the outputting of said digital data signals representing coordinate pair data to effect attenuation of said signal means.

37. The electrographic apparatus of claim 33 in which said locator means is a tracer comprising:

a body portion having two oppositely disposed upstanding sides configured for being manually grasped substantially between the thumb and forefinger of an operator's hand and having an axis extending generally parallel with said sides;

an electrically conductive annular ring mounted to and forwardly of said body position for positioning in adjacency with said resistive layer to effect electrical interaction therewith; and a transparent support mounted with said ring and having crosshairs thereon intersecting the center of said annular ring, the alignment of said crosshairs being canted with respect to said axis by a predetermined angle selected to normally align said crosshairs vertically and horizontally before said operator when said tracer is naturally grasped.

38. The electrographic apparatus of claim 37 in which said tracer crosshair cant is about 30 degrees with respect to said axis.

39. Electrographic apparatus comprising:

means defining a resistive surface of given active area and having oppositely disposed border regions;

signal treatment means including an input stage for receiving position signals to effect the amplification thereof to derive amplified position signals;

a ground reference;

switching means controllable for applying said ground reference to one said border region while simultaneously connecting said signal treatment means to the oppositely disposed said border region during a first operational mode, and for reversing said application of ground and connection of signal treatment means to said border regions during a second operational mode;

a time varying excitation source of select frequency;

locator means coupling with said source and movable about said resistive surface for capacitively coupling said source therewith during said first and second operational modes to provide for the development of said position signals;

filter means for filtering said amplified position signals in correspondence with said select frequency to provide filtered position signals;

gain control means responsive to a gain control input to impose an amplitude attenuation of said filtered position signals selected from a range of impedance derived increments of attenuation values to provide gain controlled position signals;

converter means responsive to said gain controlled position signals to provide d.c. level signals corresponding therewith;

digital converter means responsive, when actuated, to convert said d.c. level position signals to digital position signals; and control means for controlling said switching means to provide said first and second operational modes, and for providing digital data signals corresponding with said digital position signals, said control means being responsive to cyclically compare the value of said digital position signals generated for each said mode with respect to a predetermined threshold value of an acceptance range of values to derive said gain control input and resonsive to a condition wherein two said digital position signals corresponding with a single said locator means position occur simultaneously having values effecting the derivation of different said increments of attenuation, and is further responsive to generate a said gain control input representing only one elected said increment of attenuation.

40. The electrographic apparatus of claim 39 in which:

said signal treatment means includes offset network means for asserting a positive offset signal with said d.c. level position signals; and said control means is responsive to measure the value of said d.c. level position signals in the absence of said gain controlled position signals to derive an offset value and to subtract said offset value from said digital position signals.

41. The electrographic apparatus of claim 39 in which said control means is responsive to effect a comparison of the values of the difference of two successive said digital data signals with a predetermined reference value to determine state of movement of said locator means, and is responsive in the absence of said state of movement to average successively derived said digital data signals and subsequently output them, so as to avoid jitter effects at a readout thereof.

42. The electrographic apparatus of claim 39 in which:
said locator means includes signal means for providing a perceptible output when actuated; and
said control means is responsive to the outputting of said digital data signals representing coordinate pair data to effect actuation of said signal means.

43. The electrographic apparatus of claim 39 in which said locator means is a tracer comprising:
a body portion having two oppositely disposed upstanding sides configured for being manually grasped substantially between the thumb and forefinger of an operator's hand and having an axis extending generally parallel with said sides;
an electrically conductive annular ring mounted to and forwardly of said body position for positioning in adjacency with said resistive layer to effect electrical interaction therewith; and
transparent support mounted with said ring and having crosshairs thereon intersecting the center of said annular ring, the alignment of said crosshairs being canted with respect to said axis by a predetermined angle selected to normally align said crosshairs vertically and horizontally before said operator when said tracer is naturally grasped.

44. The electrographic apparatus of claim 39 in which said tracer crosshair cant is about 30 degrees with respect to said axis.

45. In an electrographic system wherein coordinate data signals are derived by interaction with a graphic surface, the improved operator controlled tracer comprising:
a body first portion having two oppositely disposed upstanding sides configured for being manually grasped substantially between the thumb and forefinger of said operator's hand and having an axis extending generally parallel with said sides;
a forward body portion extending forwardly of said first body portion inclined with respect to said axis and having an electrically conductive annular ring mounted therewith forwardly for positioning in adjacency with said surface to effect electrical interaction therewith; and
a transparent support mounted with said ring and having crosshairs thereon intersecting the center of said annular ring, the alignment of said crosshairs being canted with respect to said axis by a predetermined angle selected to normally align said crosshairs vertically and horizontally before said operator when said tracer is naturally grasped.

46. The improved tracer of claim 45 in which said tracer crosshair cant is about 30 degrees with respect to said axis.

47. The improved tracer of claim 45 in which said body portion extends upwardly from said transparent support rearwardly of said ring and said upstanding sides thereof are slanted inwardly and are dimensioned to effect the nesting of said body portion within the palm of said operator's hand.

48. Apparatus of a type wherein a surface is selectively accessed with respect to positional data, comprising:
an insulative substrate;
a resistive layer supported upon said insulative substrate and having an operational area extending between mutually parallel, spaced-apart, border regions;
a plurality of discrete, spaced-apart plus and minus contacts electrically coupled with said resistive layer at said border regions;
circuit means for providing an active electrical circuit function;
a ground reference;
a plurality of solid-state series switches, each coupled with one said contact and actuable to a closed condition in response to a select coordinate logic signal;
solid-state directional control switch means actuable in response to a plus control signal to connect said circuit means with said series switches coupled with said plus contacts and actuable in response to a minus control signal to connect said ground reference with said series switches coupled with said minus contact; and
control means coupled with said series switches and said directional control switch means for simultaneously providing a select and coordinate logic signal and a select said control signal to derive positional data modes.

49. Apparatus of a type wherein a surface is selectively accessed with respect to positional data, comprising:
an insulative substrate;
a resistive layer supported upon said insulative substrate and having an operational area extending between mutually parallel, spaced-apart border regions;
a plurality of discrete, spaced-apart plus and minus contacts electrically coupled with said resistive layer at each said border region;
a time varying excitation source of select frequency;
a ground reference;
a plurality of solid-state series switches, each coupled with one said contact and actuable to a closed condition in response to a select coordinate logic signal;
solid-state directional control switch means actuable in response to a plus control signal to connect said excitation source of select frequency with said series switches coupled with said plus contacts and actuable in response to a minus control signal to connect said ground reference with said series switches coupled with said minus contact; and
control means coupled with said series switches and said directional control switch means for simultaneously providing a select said coordinate logic signal and a select said control signal to derive positional data modes.

50. The apparatus of claim 49 further comprising:
locator means movable about said resistive layer in adjacency therewith for effecting capacitive coupling therewith at positions with respect thereto to provide position signals developed therefrom and having a given response characteristic;
signal treatment means including an input stage responsive to said position signal for effecting the amplification thereof to provide amplified position signals;
filter means for filtering said amplified position signals in correspondence with said select frequency to provide filtered position signals;
gain control means responsive to a gain control input to impose an amplitude attenuation of said filtered position signals selected from a range of impedance derived increments of attentuation values to provide gain controlled position signals;

converter means responsive to said gain control position signals to provide d.c. level position signals corresponding therewith;

digital converter means responsive, when actuated, to convert said d.c. level position signals to digital position signals; and said control means is responsive to cyclically compare the value of said digital position signals with respect to the predetermined threshold values of an acceptance range of values to derive said gain control input and for providing digital data signals corresponding with said digital position signals.

51. The electrographic apparatus of claim 49 in which:

said signal treatment means includes offset network means for asserting a positive offset signal with said d.c. level position signals; and said control means is responsive to measure the value of said d.c. level position signals in the absence of said gain controlled position signals to derive an offset value and to subtract said offset value from said digital position signals.

* * * * *